(12) United States Patent
Fukuhara et al.

(10) Patent No.: US 12,235,114 B2
(45) Date of Patent: Feb. 25, 2025

(54) SERVER FOR MANAGEMENT, ROUTINE-RUN-VEHICLE CONTROL DEVICE, AND FOLLOWING-VEHICLE CONTROL DEVICE

(71) Applicant: Mitsubishi Electric Corporation, Tokyo (JP)

(72) Inventors: Hideki Fukuhara, Tokyo (JP); Yoshihiro Nakai, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 301 days.

(21) Appl. No.: 17/790,318

(22) PCT Filed: Feb. 28, 2020

(86) PCT No.: PCT/JP2020/008249
§ 371 (c)(1),
(2) Date: Jun. 30, 2022

(87) PCT Pub. No.: WO2021/171539
PCT Pub. Date: Sep. 2, 2021

(65) Prior Publication Data
US 2022/0357164 A1 Nov. 10, 2022

(51) Int. Cl.
*G01C 21/34* (2006.01)
*G07C 5/00* (2006.01)

(52) U.S. Cl.
CPC ......... *G01C 21/3415* (2013.01); *G07C 5/008* (2013.01)

(58) Field of Classification Search
CPC ............................ G01C 21/3415; G07C 5/008
See application file for complete search history.

(56) References Cited

U.S. PATENT DOCUMENTS

2017/0293296 A1\* 10/2017 Stenneth .......... G06Q 10/06315
2017/0344023 A1 11/2017 Laubinger et al.
(Continued)

FOREIGN PATENT DOCUMENTS

JP 2017-167669 A 9/2017
JP 2019-519039 A1 7/2019
(Continued)

OTHER PUBLICATIONS

Japanese Office Action dated Feb. 28, 2023 in Japanese Application No. 2022-502762.
(Continued)

*Primary Examiner* — Seth A Silverman
(74) *Attorney, Agent, or Firm* — Sughrue Mion, PLLC

(57) ABSTRACT

A routine-run-vehicle determination unit determines a route from a departure place to a destination of a following vehicle, and a plurality of routine-run vehicles in charge of a plurality of routine-run areas overlapping the route. For each of the routine-run vehicles, a route determination unit determines a routine-run route on which the following vehicle and another following vehicle that are going to travel in a routine-run area in charge can follow, and determines a portion of the routine-run route overlapping an adjacent routine-run area as a takeover position at which the following vehicle is taken over to the next routine-run vehicle. A reservation management unit transmits routine-run-vehicle reservation data including identification information of the following vehicle, and the routine-run route and the takeover position to each of the routine-run vehicles.

10 Claims, 27 Drawing Sheets

(56) References Cited

U.S. PATENT DOCUMENTS

| | | | |
|---|---|---|---|
| 2019/0079538 A1 | 3/2019 | Switkes et al. | |
| 2019/0171225 A1 | 6/2019 | Switkes et al. | |
| 2019/0286163 A1 | 9/2019 | Yasuda et al. | |
| 2020/0020227 A1* | 1/2020 | Ran | G08G 1/075 |
| 2020/0027355 A1* | 1/2020 | Sujan | B60W 30/16 |
| 2020/0249699 A1* | 8/2020 | Kim | G05D 1/0295 |
| 2020/0264634 A1* | 8/2020 | Hadi | B60W 60/0023 |
| 2020/0286034 A1* | 9/2020 | Ur | G06Q 10/047 |

FOREIGN PATENT DOCUMENTS

| | | |
|---|---|---|
| JP | 2019-159829 A | 9/2019 |
| WO | 2018/043753 A1 | 3/2018 |

OTHER PUBLICATIONS

International Search Report for PCT/JP2020/008249 dated May 19, 2020 [PCT/ISA/210].

Office Action issued May 30, 2024 in Chinese Application No. 202080097436.0.

\* cited by examiner

SERVER FOR MANAGEMENT, ROUTINE-RUN-VEHICLE CONTROL DEVICE, AND FOLLOWING-VEHICLE CONTROL DEVICE

CROSS REFERENCE TO RELATED APPLICATIONS

This application is a National Stage of International Application No. PCT/JP2020/008249, filed on Feb. 28, 2020.

TECHNICAL FIELD

The present disclosure relates to a server for management, a routine-run-vehicle control device, and a following-vehicle control device.

BACKGROUND ART

The development of the self-driving technology enables one or more following vehicles to follow a leading vehicle by the self-driving technology, so that the leading vehicle and the one or more following vehicles can travel in a platoon. The platoon travel of routine-run vehicles has been proposed as an example of the platoon travel (see, for example, Patent Literature 1). Patent Literature 1 describes a method in which a certain routine-run vehicle moves to a place other than its own routine-run route by repeatedly following and leaving another routine-run vehicle on the same routine-run route partway.

CITATION LIST

Patent Literatures

Patent Literature 1: JP 2017-167669 A

SUMMARY OF INVENTION

Technical Problem

There is an upper limit to the number of following vehicles that can follow one leading vehicle because the platoon is divided at an intersection or the like. For this reason, in the traffic system described in Patent Literature 1, if the number of following routine-run vehicles is large, there is a possibility that the number of leading routine-run vehicles is insufficient. In addition, in a case where the number of following routine-run vehicles is small or no following routine-run vehicle is present, there is a possibility that the leading routine-run vehicle is uselessly operated. As described above, in the traffic system described in Patent Literature 1, there is a problem that excess or deficiency occurs in the number of routine-run vehicles at the head of platoon travel.

The present disclosure has been made to solve the above problems, and an object of the present disclosure is to prevent excess or deficiency in the number of routine-run vehicles a routine-run vehicle at the head of platoon travel.

Solution To Problem

A server for management according to the present disclosure including processing circuitry configured communicate with a plurality of routine-run vehicles and one or more following vehicles that are going to follow each of the routine-run vehicles; determine, when a departure place and a destination of a first following vehicle are received, a route from the departure place to the destination and first routine-run vehicles in charge of a plurality of routine-run areas overlapping the route; determine, for each of the determined first routine-run vehicles a routine-run route on which the first following vehicle and a second following vehicle that are going to travel in a routine-run area in charge can follow, and to determine a portion of the routine-run route overlapping an adjacent routine-run area as a takeover position at which the first following vehicle is taken over to a next second routine-run vehicle; and transmit, via communication, routine-run-vehicle reservation data including identification information of the determined first following vehicle, the routine-run route and the takeover position to each of the determined first routine-run vehicles and that the first following vehicle is going to follow from the departure place to the destination, and to transmit, via the communication, following-vehicle reservation data including identification information of the first routine-run vehicles that the first following vehicle is going to follow from the departure place to the destination and the takeover position to the first following vehicle.

Advantageous Effects of Invention

According to the present disclosure, as the server for management integrally manages the routine-run vehicle and the following vehicle by transmitting the reservation data to the routine-run vehicle and the following vehicle, excess and deficiency in the number of routine-run vehicles at the head of platoon travel can be prevented.

DESCRIPTION OF EMBODIMENTS

Hereinafter, in order to describe the present disclosure in more detail, modes for carrying out the present disclosure will be described with reference to the accompanying drawings.

First Embodiment

Figure 1:
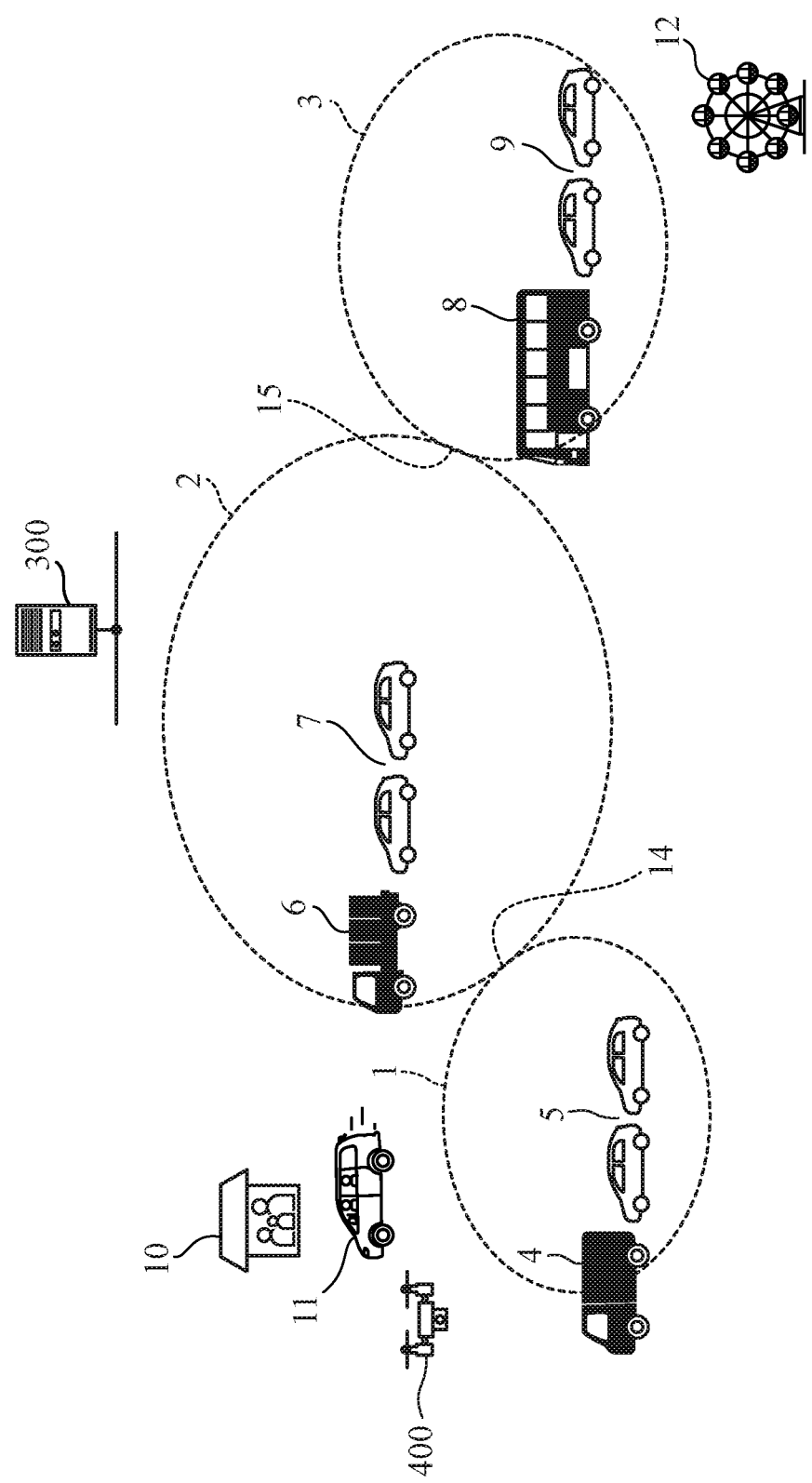
FIG. 1 is a diagram illustrating an overall configuration of a traffic system according to a first embodiment.

FIG. 1 is a diagram illustrating an overall configuration of a traffic system according to a first embodiment. The traffic system includes one server 300 for management, a plurality of routine-run vehicles 4, 6, and 8, and a plurality of following vehicle groups 5, 7, and 9. The routine-run vehicles 4, 6, and 8 are, for example, a public bus, a round bus, a tourist bus, a long-distance truck, and a night bus. The routine-run vehicles 4, 6, and 8 are assumed to be, for example, self-driving level 5 (fully self-driving) vehicles defined by Society of Automotive Engineers (SAE), but can be remotely driven vehicles or manually driven vehicles. The individual vehicles in the following vehicle groups 5, 7, and 9 are self-driving level 2 (partially self-driving) vehicles or higher-level vehicles.

The routine-run vehicle 4 operates on a routine-run route 1 in a routine-run area in charge. The following vehicle group 5 including one or more vehicles follows the routine-run vehicle 4. The routine-run vehicle 6 in charge of a routine-run area different from that of the routine-run vehicle 4 operates on a routine-run route 2. Note, however, that the routine-run area assigned to the routine-run vehicle 4 and the routine-run area assigned to the routine-run vehicle 6 partially overlap each other, and the routine-run route 1 and the routine-run route 2 also partially overlap each other. The position where the routine-run route 1 and the routine-run route 2 overlap is a takeover position 14. The following vehicle group 7 including one or more vehicles follows the routine-run vehicle 6.

Furthermore, the routine-run vehicle 8 in charge of a routine-run area different from those of the routine-run vehicle 4 and the routine-run vehicle 6 operates on a routine-run route 3. Note, however, that the routine-run area assigned to the routine-run vehicle 6 and the routine-run area assigned to the routine-run vehicle 8 partially overlap each other, and the routine-run route 2 and the routine-run route 3 also partially overlap each other. The position where the routine-run route 2 and the routine-run route 3 overlap is a takeover position 15. The following vehicle group 9 including one or more vehicles follows the routine-run vehicle 8.

Note that FIG. 1 illustrates an example in which one routine-run vehicle operates in each of three routine-run areas in order to simplify the description, but a plurality of routine-run vehicles may operate in one routine-run area.

A home 10 is near the routine-run route 1, and a user vehicle 11 is parked. A destination 12 of the user vehicle 11 is near the routine-run route 3 and is located away from the home 10. The user vehicle 11 corresponds to a following vehicle.

The server 300 for management determines one or more routine-run vehicles 4, 6, and 8 that the user vehicle 11 follows in order to move from the home 10 to the destination 12 by using information of the home 10, which is the departure place of the user vehicle 11, and the destination 12, information of the routine-run areas assigned to the routine-run vehicles 4, 6, and 8, and the like. In addition, the server 300 for management determines the routine-run route 1 on which the user vehicle 11 and the following vehicle group 5, which are going to travel in the routine-run area assigned to the routine-run vehicle 4, can follow and determines a portion of the routine-run route 1 overlapping the adjacent routine-run area as the takeover position 14 of the user vehicle 11. Similarly, the server 300 for management determines the routine-run routes 2 and 3 on which the user vehicle 11 and the following vehicle groups 7 and 9, which are going to travel in the routine-run areas assigned to the routine-run vehicles 6 and 8, can follow and determines portions of the routine-run routes 2 and 3 overlapping the adjacent routine-run area as the takeover position 15 of the user vehicle 11. The server 300 for management then transmits routine-run-vehicle reservation data indicating the user vehicle 11 to follow, the routine-run routes 1, 2, and 3, and the takeover positions 14 and 15 to each of the routine-run vehicles 4, 6, and 8. In addition, the server 300 for management transmits following-vehicle reservation data indicating the routine-run vehicles 4, 6, and 8 to be followed, and the takeover positions 14 and 15 to the user vehicle 11.

While operating on the routine-run routes 1, 2, and 3, the routine-run vehicle 4, 6, and 8 permit the user vehicle 11 to follow, and instructs the user vehicle 11 to leave at the takeover positions 14 and 15 based on the reservation data. Based on the reservation data, the user vehicle 11 receives the permission to follow the routine-run vehicle 4 around the home 10 which is the departure place, moves on the routine-run route 1 while following the routine-run vehicle 4 to arrive at the takeover position 14, and leaves the routine-run vehicle 4. Subsequently, the user vehicle 11 receives the permission to follow the routine-run vehicle 6 at the takeover position 14, moves on the routine-run route 2 while following the routine-run vehicle 6 to arrive at the takeover position 15, and leaves the routine-run vehicle 6. Next, the user vehicle 11 receives the permission to follow the routine-run vehicle 8 at the takeover position 15, moves on the routine-run route 3 while following the routine-run vehicle 8, and goes to the destination 12.

As described above, the server 300 for management integrally manages the information of the routine-run vehicle and the following vehicle, thereby setting in advance the number of following vehicles for the routine-run vehicle, the point at which the routine-run vehicle is replaced, and the like. In addition, the server 300 for management reduces the number of routine-run vehicles in a case where the number of following vehicles is small and increases the number of routine-run vehicles in a case where the number of following vehicles is large, which makes it possible to prevent excess or deficiency in the number of routine-run vehicles, so that the following vehicle group is not divided at an intersection or the like and the routine-run vehicle is not wasted. Furthermore, as the server 300 for management replaces the routine-run vehicle followed by the following vehicle with another routine-run vehicle at a point at which the routine-run routes overlap, the following vehicle can move to a distant destination without manual driving by a user.

Note that there is a case where only one routine-run vehicle to be followed from the departure place to the destination is present because the departure point and the destination of the following vehicle are close to each other. Also in this case, as described above, the server 300 for management determines one routine-run vehicle followed by the following vehicle and the routine-run route of the routine-run vehicle and generates the routine-run-vehicle reservation data and the following-vehicle reservation data by using the information of the departure place and the destination of the following vehicle, the information of the routine-run area for the routine-run vehicle, and the like.

A drone 400 in FIG. 1 will be described later.

Next, a routine-run-vehicle control device 100 will be described.

Figure 2:
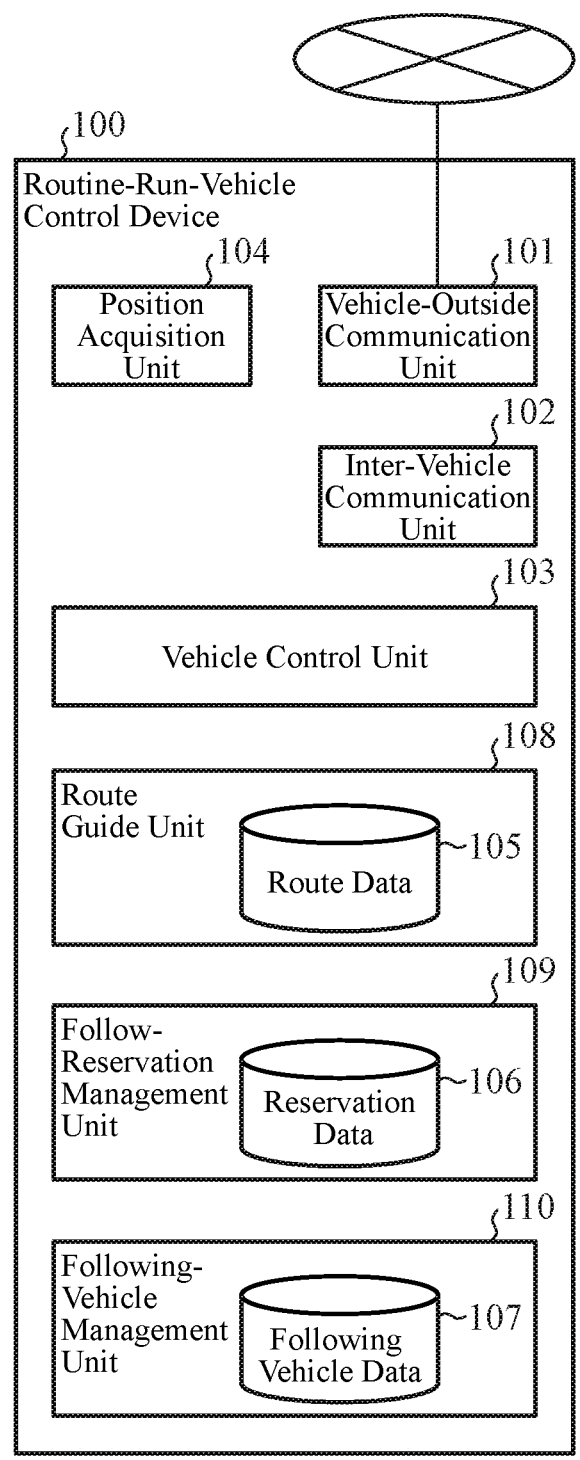
FIG. 2 is a block diagram illustrating a configuration example of a routine-run-vehicle control device according to the first embodiment.

FIG. 2 is a block diagram illustrating a configuration example of the routine-run-vehicle control device 100 according to the first embodiment. The routine-run-vehicle control device 100 is mounted on each of the routine-run vehicles 4, 6, and 8 illustrated in FIG. 1. The routine-run-vehicle control device 100 includes a vehicle-outside communication unit 101, an inter-vehicle communication unit 102, a vehicle control unit 103, a position acquisition unit 104, a route guide unit 108, a follow-reservation management unit 109, and a following-vehicle management unit 110.

Figure 11:
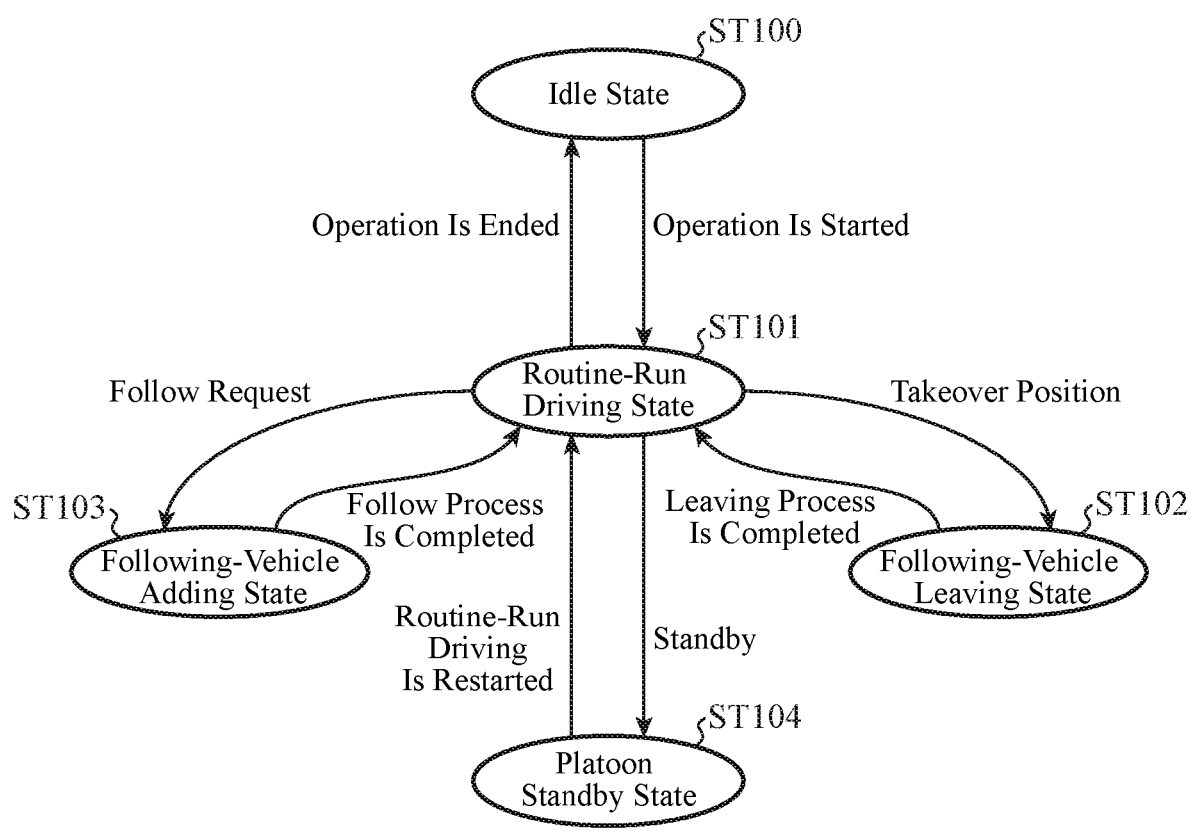
FIG. 11 is a state transition diagram of a routine-run vehicle in the first embodiment.

The vehicle-outside communication unit 101 communicates with the server 300 for management through a public line. The inter-vehicle communication unit 102 communicates with a following-vehicle control device 200 mounted on a surrounding vehicle. Unlike the vehicle-outside communication unit 101, the inter-vehicle communication unit 102 performs communication at a relatively short distance. The vehicle control unit 103 causes a routine-run vehicle to self-drive along a routine-run route an instruction about which is given by the route guide unit 108. The position acquisition unit 104 acquires position information of the routine-run vehicle. The position information of the routine-run vehicle acquired by the position acquisition unit 104 is periodically transmitted from the vehicle-outside communication unit 101 to the server 300 for management and from the inter-vehicle communication unit 102 to the following vehicle together with identification information and state information of the routine-run vehicle. The identification information of the routine-run vehicle can be a license number of the routine-run vehicle, an identification number of the routine-run-vehicle control device 100 mounted on the routine-run vehicle, or the like. The state information of the routine-run vehicle is information indicating any one of an idle state, a routine-run driving state, a following-vehicle leaving state, a following-vehicle adding state, and a platoon standby state, which are illustrated in FIG. 11 to be described later.

Route data 105 is information that indicates a routine-run route on which the routine-run vehicle operates and that is included in the routine-run-vehicle reservation data received by the vehicle-outside communication unit 101 from the server 300 for management. The route data 105 is stored in the route guide unit 108. The route guide unit 108 instructs the vehicle control unit 103 about the traveling direction and the like of the routine-run vehicle using the route data 105 and the position information acquired by the position acquisition unit 104. The route guide unit 108 and the vehicle control unit 103 implement, for example, the function of the self-driving level 5.

Reservation data 106 is routine-run-vehicle reservation data received by the vehicle-outside communication unit 101 from the server 300 for management. The reservation data 106 is stored and managed in the follow-reservation management unit 109. The reservation data 106 includes identification information of a following vehicle that is going to follow the routine-run vehicle. The identification information of the following vehicle can be a license number of the following vehicle, an identification number of the following-vehicle control device 200 (see FIG. 3) mounted on the following vehicle, or the like. In addition, the reservation data 106 includes a takeover position and a takeover time at which the following vehicle finishes following the routine-run vehicle and is going to follow another routine-run vehicle, and identification information of the other routine-run vehicle. Furthermore, the reservation data 106 includes information of a route on which the routine-run vehicle operates, an operation start time, and the like.

Figure 5:
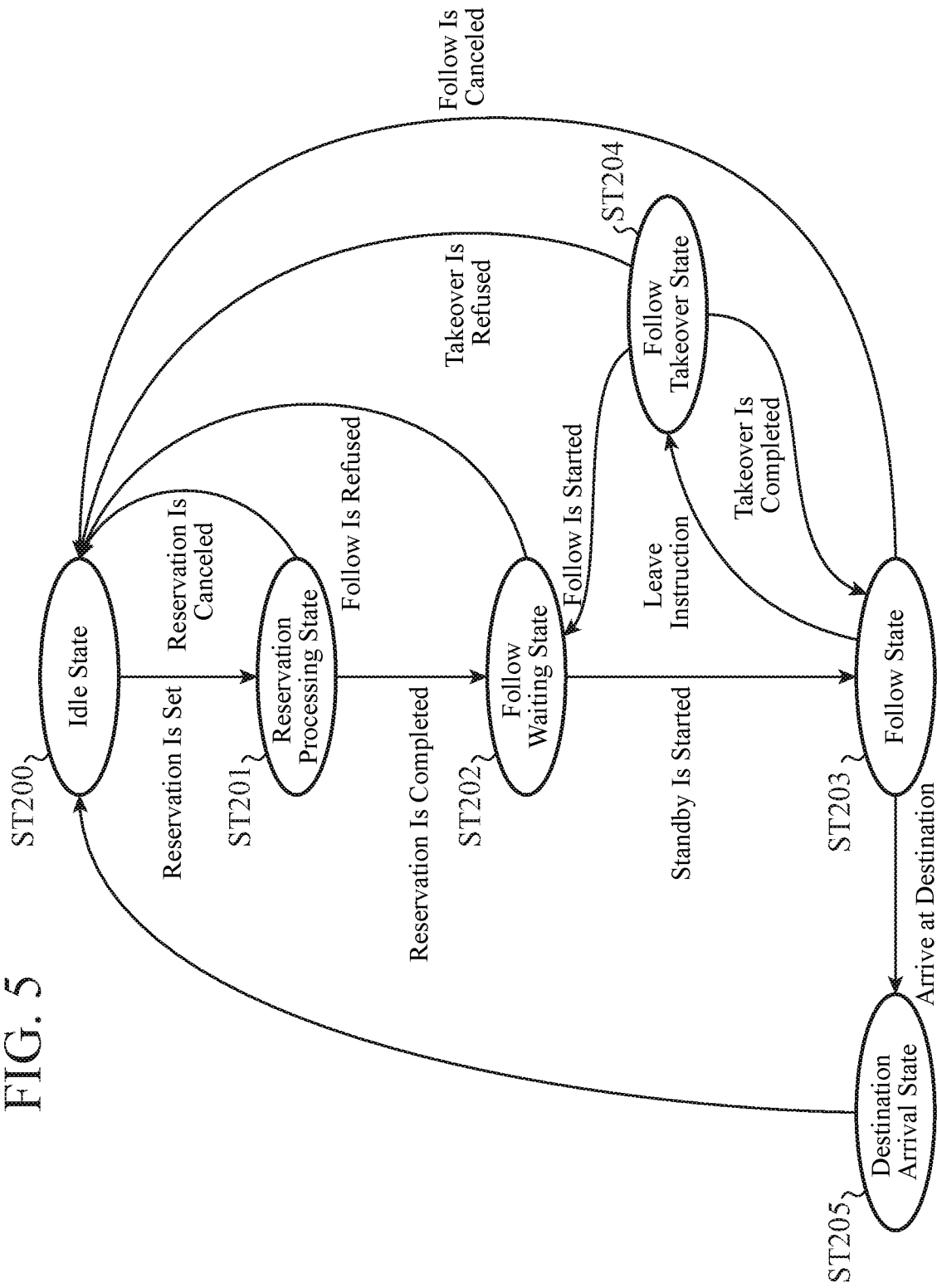
FIG. 5 is a state transition diagram of a following vehicle in the first embodiment.

Following vehicle data 107 is information indicating the state of the following vehicle currently following the routine-run vehicle. The following vehicle data 107 is stored and managed in the following-vehicle management unit 110. The following vehicle data 107 includes identification information of the following vehicle, position information of the following vehicle, and state information of the following vehicle received by the inter-vehicle communication unit 102 from the following vehicle currently following the routine-run vehicle. The state information of the following vehicle is information indicating any one of an idle state, a reservation process state, a follow waiting state, a follow state, a follow takeover state, and a destination arrival state, which are illustrated in FIG. 5 to be described later.

In a case where the inter-vehicle communication unit 102 receives a follow request from a surrounding vehicle, the following-vehicle management unit 110 gives the surrounding vehicle vehicle-following permission via the inter-vehicle communication unit 102 if the identification information of the surrounding vehicle matches the identification information of the following vehicle included in the reservation data 106, and then manages the reservation data 106 related to the surrounding vehicle as the following vehicle data 107 of the following vehicle currently following the routine-run vehicle. In addition, in a case where the routine-run vehicle comes to the takeover position of the following vehicle currently following the routine-run vehicle, the following-vehicle management unit 110 gives the following vehicle currently following the routine-run vehicle a leave instruction via the inter-vehicle communication unit 102.

Note that the routine-run-vehicle control device 100 of FIG. 2 has a configuration in which the vehicle control unit 103 causes the routine-run vehicle to self-drive based on the instruction of the route guide unit 108, but is not limited to this configuration. For example, the routine-run-vehicle control device 100 may have a configuration in which an occupant of the routine-run vehicle manually drives or a configuration in which an operator at a remote location performs remote driving. In the case of manual driving, for example, the route guide unit 108 guides the routine-run route to the occupant of the routine-run vehicle using at least one of a voice or a display, and the occupant manually drives in accordance with the guide. The route guide unit 108 can use at least one (not illustrated) of a speaker or a display included in the routine-run-vehicle control device 100 or can use at least one (not illustrated) of a speaker or a display included in the routine-run vehicle to guide the routine-run route. In the case of remote driving, for example, the route guide unit 108 transmits the route data 105, position information, other information (for example, a video captured by a vehicle-outside camera) necessary for remote driving, and the like to a remote driving terminal via the vehicle-outside communication unit 101. The remote driving terminal presents various types of information received from the routine-run-vehicle control device 100 to an operator, receives information of remote driving from the operator, and transmits the received information of remote driving to the routine-run-vehicle control device 100. The vehicle control unit 103 receives the information of remote driving from the remote driving terminal via the vehicle-outside communication unit 101, and controls the routine-run vehicle using the received information of remote driving.

Next, the following-vehicle control device 200 will be described.

Figure 3:
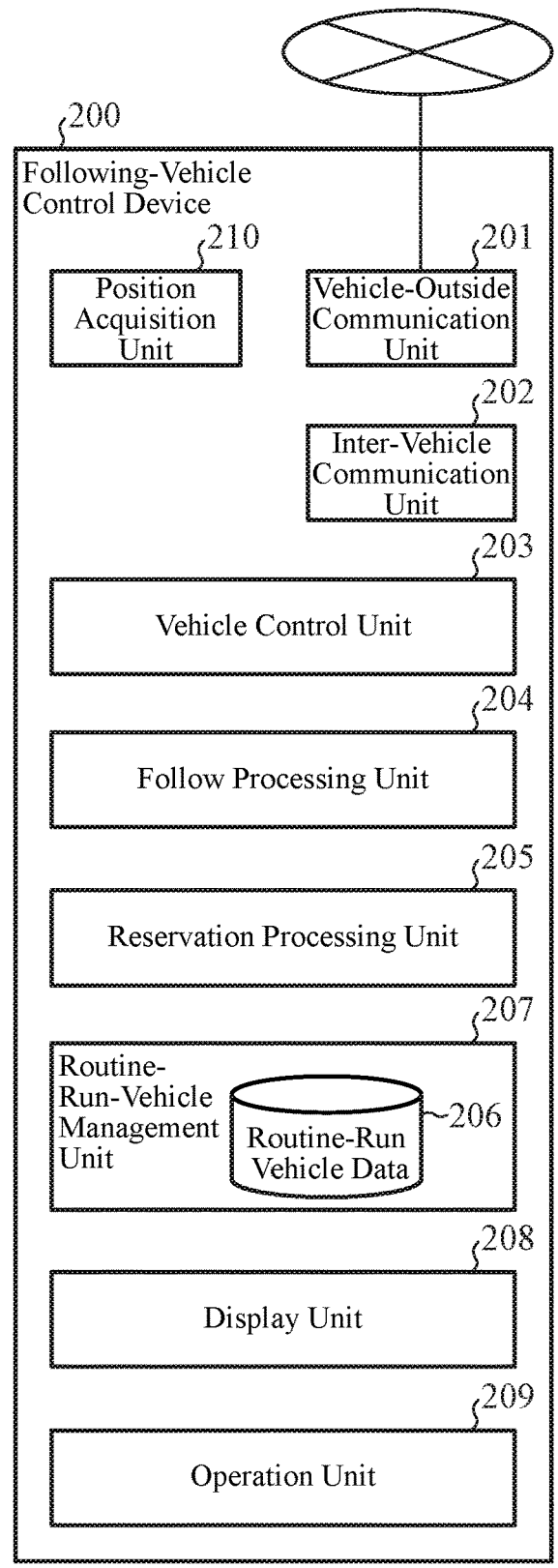
FIG. 3 is a block diagram illustrating a configuration example of a following-vehicle control device according to the first embodiment.

FIG. 3 is a block diagram illustrating a configuration example of the following-vehicle control device 200 according to the first embodiment. The following-vehicle control device 200 is mounted on the user vehicle 11 and the following vehicles constituting the following vehicle groups 5, 7, and 9 illustrated in FIG. 1. The following-vehicle control device 200 includes a vehicle-outside communication unit 201, an inter-vehicle communication unit 202, a vehicle control unit 203, a follow processing unit 204, a reservation processing unit 205, a routine-run-vehicle management unit 207, a display unit 208, and an operation unit 209.

The vehicle-outside communication unit 201 communicates with the server 300 for management through a public line. The inter-vehicle communication unit 202 communicates with the routine-run-vehicle control device 100 mounted on a surrounding vehicle. Unlike the vehicle-outside communication unit 201, the inter-vehicle communication unit 202 performs communication at a relatively short distance. The vehicle control unit 203 controls the following vehicle based on an instruction from the follow processing unit 204. The vehicle control unit 203 corresponds to, for example, the function of the self-driving level 2 or higher. A position acquisition unit 210 acquires position information of the following vehicle. The position information of the following vehicle acquired by the position acquisition unit 210 is periodically transmitted from the vehicle-outside communication unit 201 to the server 300 for management and from the inter-vehicle communication unit 202 to the routine-run vehicle together with identification information and state information of the following vehicle.

In a case where the following vehicle comes to at each takeover position included in routine-run vehicle data 206, the follow processing unit 204 issues a follow request to the routine-run vehicle to be followed via the inter-vehicle communication unit 202, and when receiving permission to follow from the routine-run vehicle to be followed via the inter-vehicle communication unit 202, the follow processing unit 204 outputs an instruction to start following the routine-run vehicle to be followed to the vehicle control unit 203. In addition, in a case where the inter-vehicle communication unit 202 receives a leave instruction from the routine-run vehicle to be followed, the follow processing unit 204 outputs an instruction to end following the routine-run vehicle to be followed to the vehicle control unit 203. Furthermore, while the host following vehicle follows the routine-run vehicle, the follow processing unit 204 instructs the vehicle control unit 203 about the distance between the preceding vehicle and the host following vehicle or the like. In a case where the host following vehicle is immediately behind the routine-run vehicle, a preceding vehicle is the routine-run vehicle. In a case where the host following vehicle is immediately behind another following vehicle following the routine-run vehicle, the preceding vehicle is the other following vehicle. The follow processing unit 204 and the vehicle control unit 203 implement, for example, the function of the self-driving level 2 or higher.

The reservation processing unit 205 transmits, as reserved vehicle information, information such as a departure place, a departure time, and a destination set by the user of the following vehicle operating the operation unit 209 to the server 300 for management via the vehicle-outside communication unit 201. In addition, the reservation processing unit 205 receives, from the server 300 for management via the vehicle-outside communication unit 201, identification information of one or more routine-run vehicles that the following vehicle is going to follow when going from the departure place to the destination, and following-vehicle reservation data indicating a takeover position, a takeover time, and the like at which the following vehicle is going to start following each of the one or more routine-run vehicles. The reservation processing unit 205 stores the received reservation data in the routine-run-vehicle management unit 207 as the routine-run vehicle data 206.

The routine-run vehicle data 206 is information of a routine-run vehicle to be followed, and includes following-vehicle reservation data received by the reservation processing unit 205 from the server 300 for management. The routine-run vehicle data 206 is stored and managed in the routine-run-vehicle management unit 207. The routine-run vehicle data 206 includes identification information of a routine-run vehicle to be followed by the following vehicle, and a takeover position and a takeover time at which the following vehicle is going to start following the routine-run vehicle. In addition, the routine-run vehicle data 206 includes identification information of the routine-run vehicle, position information of the routine-run vehicle, and state information of the routine-run vehicle received by the inter-vehicle communication unit 202 from the routine-run vehicle that the following vehicle currently follows.

The display unit 208 and the operation unit 209 are human machine interfaces (HMI) for exchanging information between the reservation processing unit 205 and the user. The display unit 208 displays a destination setting screen generated by the reservation processing unit 205 when the user sets reserved vehicle information such as a destination. The operation unit 209 receives a user operation for setting a departure place, a destination, and the like, and outputs the received operation content to the reservation processing unit 205.

Next, the server 300 for management will be described.

Figure 4:
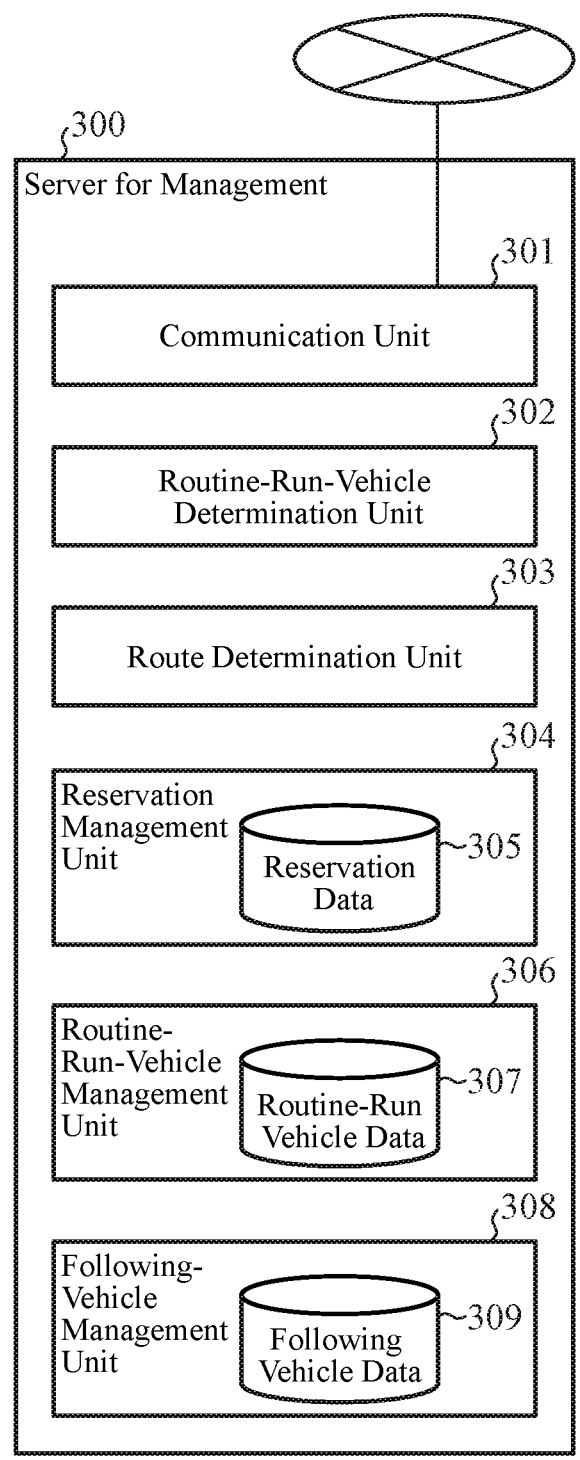
FIG. 4 is a block diagram illustrating a configuration example of a server for management according to the first embodiment.

FIG. 4 is a block diagram illustrating a configuration example of the server 300 for management according to the first embodiment. The server 300 for management includes a communication unit 301, a routine-run-vehicle determination unit 302, a route determination unit 303, a reservation management unit 304, a routine-run-vehicle management unit 306, and a following-vehicle management unit 308.

The communication unit 301 communicates with the routine-run-vehicle control device 100 and the following-vehicle control device 200 through a public line. The routine-run-vehicle determination unit 302 determines one or more routine-run vehicles that the following vehicle is going to follow when going from a departure place to a destination by using the reserved vehicle information received by the communication unit 301 from the following vehicle and information of routine-run areas assigned to a plurality of routine-run vehicles. For each of the one or more routine-run vehicles determined by the routine-run-vehicle determination unit 302, the route determination unit 303 determines a routine-run route on which the one or more following vehicles can follow by using the reserved vehicle information of the one or more following vehicles that are going to travel in the routine-run area in charge, and determines a portion of the routine-run route overlapping the adjacent routine-run area as the takeover position and the takeover time of the following vehicle. For each of one or more routine-run vehicles determined by the routine-run-vehicle determination unit 302, the route determination unit 303 generates routine-run-vehicle reservation data including the identification information of a following vehicle to follow, a routine-run route, a takeover position, and a takeover time, and transmits the generated routine-run vehicle reservation data via the communication unit 301. In addition, the route determination unit 303 generates, for the following vehicle, the following-vehicle reservation data including the identification information of one or more routine-run vehicles that the following vehicle is going to follow when going from the departure place to the destination, the takeover position, and the takeover time, and transmits the generated following-vehicle reservation data via the communication unit 301.

Reservation data 305 includes following-vehicle reservation data and routine-run-vehicle reservation data generated by the route determination unit 303. The reservation data 305 is stored and managed in the reservation management unit 304. The reservation data 305 includes a departure place, a destination, a departure time, identification information, and takeover information of the following vehicle, and route information of the routine-run vehicle. The takeover information includes a takeover position and a takeover time at which the following vehicle finishes following the routine-run vehicle and is going to follow another routine-run vehicle, and identification information of each routine-run vehicle.

Routine-run vehicle data 307 is information indicating a routine-run vehicle managed by the server 300 for management, and includes identification information, position information, and state information of the routine-run vehicle, which are information received by the communication unit 301 from the routine-run-vehicle control device 100 mounted on each routine-run vehicle, and information of a routine-run route determined by the route determination unit 303. The routine-run vehicle data 307 is stored and managed in the routine-run-vehicle management unit 306.

Following vehicle data 309 is information indicating a following vehicle managed by the server 300 for management, and includes identification information, position information, and state information of the following vehicle, which are information received by the communication unit 301 from the following-vehicle control device 200 mounted on each following vehicle. The following vehicle data 309 is stored and managed in the following-vehicle management unit 308.

Next, operations of the routine-run-vehicle control device 100, the following-vehicle control device 200, and the server 300 for management will be described with reference to FIG. 1.

First, the operation of the following-vehicle control device 200 will be described.

FIG. 5 is a state transition diagram of a following vehicle in the first embodiment. Here, the following-vehicle control device 200 mounted on the user vehicle 11 will be described as an example.

The idle state in step ST200 is a state where the user vehicle 11 does not follow a routine-run vehicle. In the idle state, when the user of the user vehicle 11 performs reservation setting on the following-vehicle control device 200, the state of the user vehicle 11 transitions to a reservation processing state in step ST201. The following-vehicle control device 200 performs a reservation process of FIG. 6.

Figure 6:
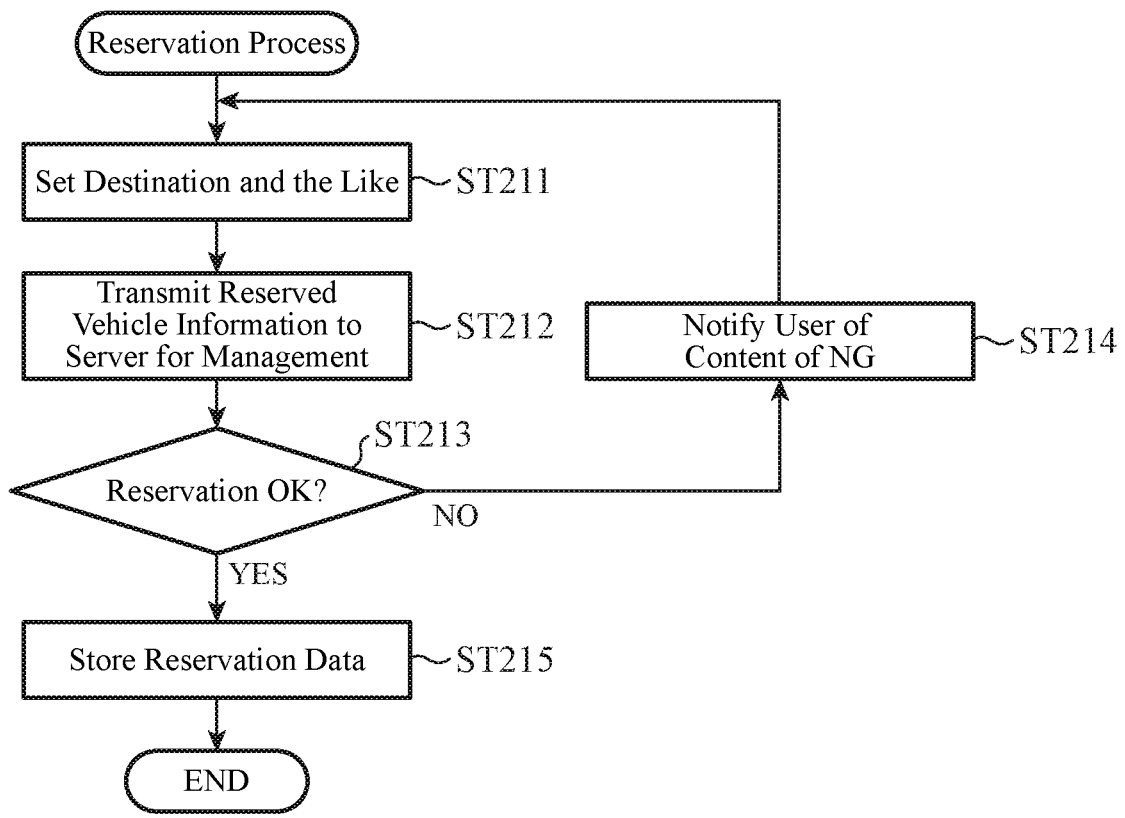
FIG. 6 is a flowchart of a reservation process (step ST201 in FIG. 5) performed by the following-vehicle control device.

FIG. 6 is a flowchart of the reservation process (step ST201 in FIG. 5) performed by the following-vehicle control device 200.

In step ST211, the reservation processing unit 205 causes the display unit 208 to display a destination setting screen. The operation unit 209 receives a user operation for setting a departure place, a departure time, a destination, and the like, and outputs the received operation content to the reservation processing unit 205. The reservation processing unit 205 receives the operation content from the operation unit 209, and generates reserved vehicle information including the departure place, the departure time, the destination, and identification information of the user vehicle 11.

In step ST212, the vehicle-outside communication unit 201 transmits the reserved vehicle information generated by the reservation processing unit 205 to the server 300 for management. In step ST213, the vehicle-outside communication unit 201 receives following-vehicle reservation data from the server 300 for management.

The vehicle-outside communication unit 201 receives the reservation data and if the reservation data includes information indicating "reservation OK" (step ST213 "YES"), the reservation processing unit 205 outputs the reservation data to the routine-run-vehicle management unit 207. In step ST215, the routine-run-vehicle management unit 207 stores the reservation data as the routine-run vehicle data 206. The routine-run vehicle data 206 includes identification information of the routine-run vehicles 4, 6, and 8 that the user vehicle 11 is going to follow, a departure place and a follow start time at which the user vehicle 11 starts following the routine-run vehicle 4, the takeover position 14 and a takeover time at which the user vehicle 11 starts following the routine-run vehicle 6, and the takeover position 15 and a takeover time at which the user vehicle 11 starts following the routine-run vehicle 8.

On the other hand, if the reservation data received by the vehicle-outside communication unit 201 includes information indicating "reservation NG" (step ST213 "NO"), the reservation processing unit 205 notifies the user of the fact of the reservation NG by, for example, causing the display unit 208 to display the reason for the reservation NG (step ST214). In this case, the reservation processing unit 205 causes the user to set the destination and the like again (step ST211). Note that reservation processing unit 205 may cancel the reservation process without causing the user to set the destination and the like again. If the reservation process is canceled, the user vehicle 11 transitions to the idle state in step ST200.

When the reservation is completed, the user vehicle 11 transitions from the reservation processing state in step ST201 to a follow waiting state in step ST202. The following-vehicle control device 200 performs a follow waiting process of FIG. 7.

Figure 7:
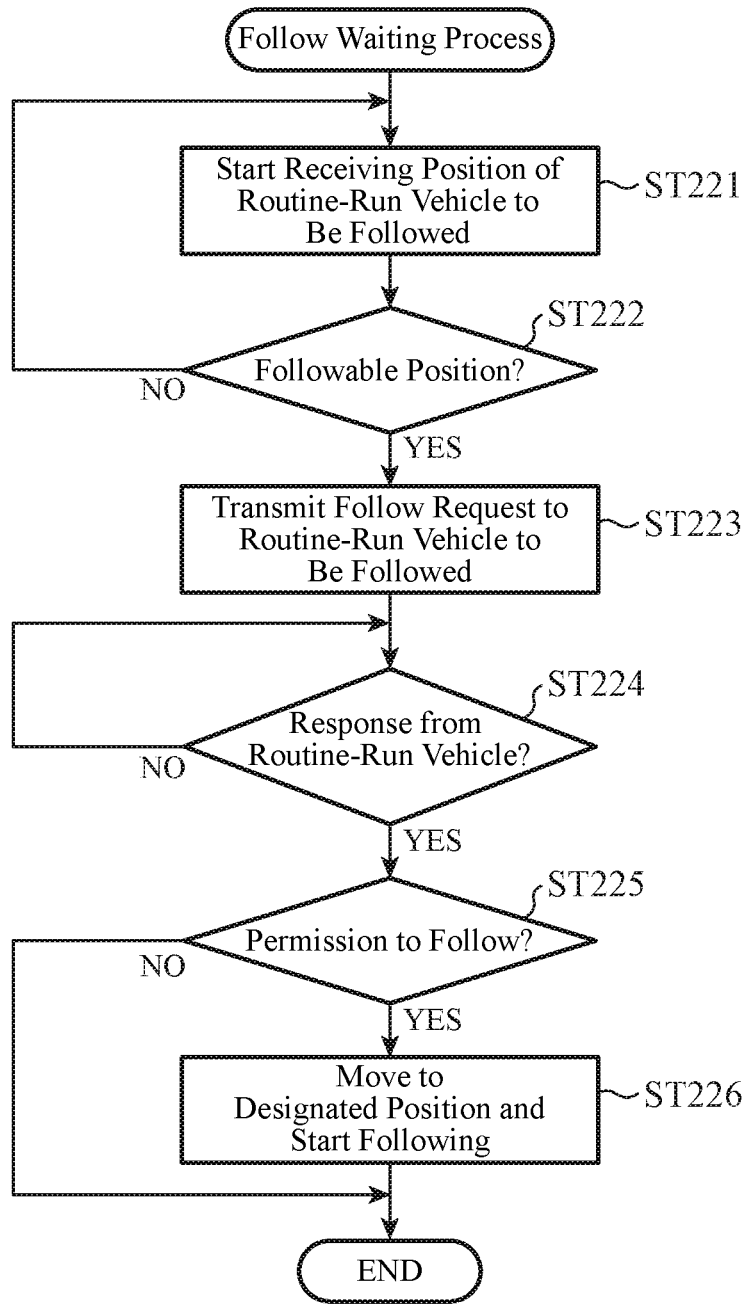
FIG. 7 is a flowchart of a follow waiting process (step ST202 in FIG. 5) performed by the following-vehicle control device.

FIG. 7 is a flowchart of the follow waiting process (step ST202 in FIG. 5) performed by the following-vehicle control device 200.

In step ST221, the vehicle-outside communication unit 201 receives position information of a routine-run vehicle that the user vehicle 11 is going to follow from the server 300 for management. In step ST222, the follow processing unit 204 refers to the routine-run vehicle data 206 and determines whether or not the position of the routine-run vehicle to be followed is a followable position. For example, if the position of the routine-run vehicle 4 that the user vehicle 11 is going to follow is within 50 m of the home 10 as the departure place, the follow processing unit 204 determines that the routine-run vehicle 4 is at the followable position. In addition, after the user vehicle 11 leaves the routine-run vehicle 4, if the position of the routine-run vehicle 6 that the user vehicle 11 is going to follow is within 50 m of the takeover position 14, the follow processing unit 204 determines that the routine-run vehicle 6 is at the followable position.

If the position of the routine-run vehicle to be followed is the followable position (step ST222 "YES"), the follow processing unit 204 transmits a follow request to the routine-run-vehicle control device 100 mounted on the routine-run vehicle to be followed via the inter-vehicle communication unit 202 (step ST223). The follow processing unit 204 then waits for a response from the following-vehicle control device 200 (step ST224 "NO").

If the inter-vehicle communication unit 202 receives a response from the routine-run-vehicle control device 100 mounted on the routine-run vehicle to be followed (step ST224 "YES"), and if the response is permission to follow (step ST225 "YES"), the follow processing unit 204 outputs a follow start instruction to the vehicle control unit 203 (step ST226). Based on a designated position included in the response, the vehicle control unit 203 moves to the designated position (for example, the end of the line) in a platoon with the routine-run vehicle at the head, and starts following.

On the other hand, if the response from the routine-run-vehicle control device 100 mounted on the routine-run vehicle to be followed is a refusal to follow for some reason (step ST225 "NO"), the follow processing unit 204 instructs the vehicle control unit 203 to stand by as it is. In this case, the follow processing unit 204 may display the reason for the refusal to follow on the display unit 208.

When starting following, the user vehicle 11 transitions from the follow waiting state in step ST202 to a follow state in step ST203. The following-vehicle control device 200 performs a follow process of FIG. 8.

Figure 8:
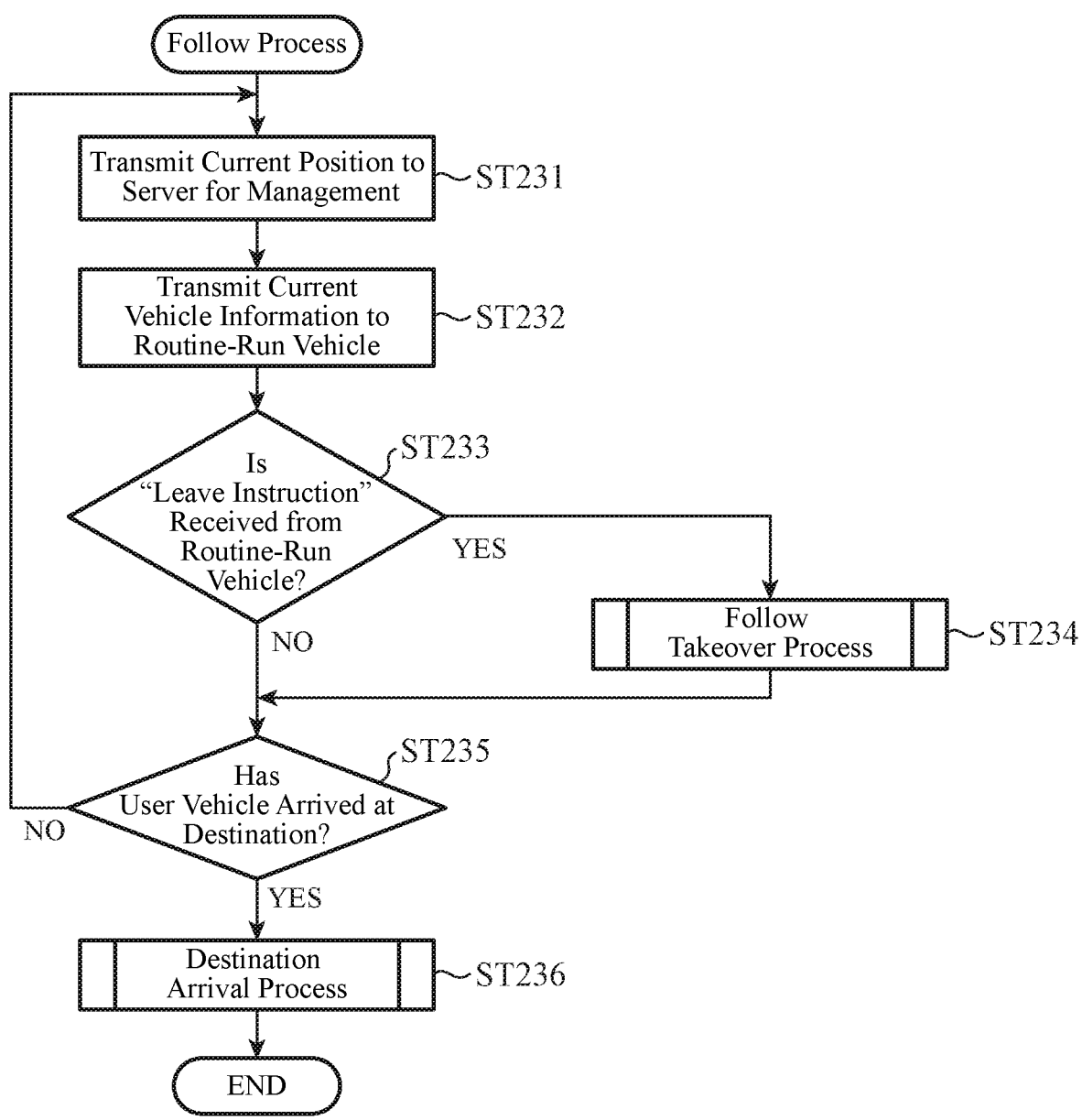
FIG. 8 is a flowchart of a follow process (step ST203 in FIG. 5) performed by the following-vehicle control device.

FIG. 8 is a flowchart of the follow process (step ST203 in FIG. 5) performed by the following-vehicle control device 200.

In step ST231, the vehicle-outside communication unit 201 transmits the current position information and the like of the user vehicle 11 acquired by the position acquisition unit 210 to the server 300 for management. In step ST232, the inter-vehicle communication unit 202 transmits the current vehicle information of the user vehicle 11 to the currently followed routine-run vehicle. The vehicle information includes position information, a vehicle speed, a distance to empty, a state of occupants, and the like of the user vehicle 11.

In step ST233, if the inter-vehicle communication unit 202 receives "leave instruction" from the routine-run-vehicle control device 100 mounted on the currently followed routine-run vehicle (step ST233 "YES"), the follow processing unit 204 performs a follow takeover process in step ST234. "Leave instruction" is transmitted from the currently followed routine-run vehicle when the user vehicle 11 arrives at the takeover position and changes the routine-run vehicle.

On the other hand, if the inter-vehicle communication unit 202 does not receive "leave instruction" (step ST233 "NO"), the follow processing unit 204 determines whether or not the user vehicle 11 has arrived at the destination 12 using the position information of the user vehicle 11 acquired by the position acquisition unit 210 (step ST235). If the user vehicle 11 has arrived at the destination 12 (step ST235 "YES"), the follow processing unit 204 performs a destination arrival processing in step ST236. On the other hand, if the user vehicle 11 has not arrived at the destination 12 (step ST235 "NO"), the process of the following-vehicle control device 200 returns to step ST231.

When receiving "leave instruction" from the routine-run vehicle, the user vehicle 11 transitions from the follow state in step ST203 to a follow takeover state in step ST204. The following-vehicle control device 200 performs a follow takeover process of FIG. 9.

Figure 9:
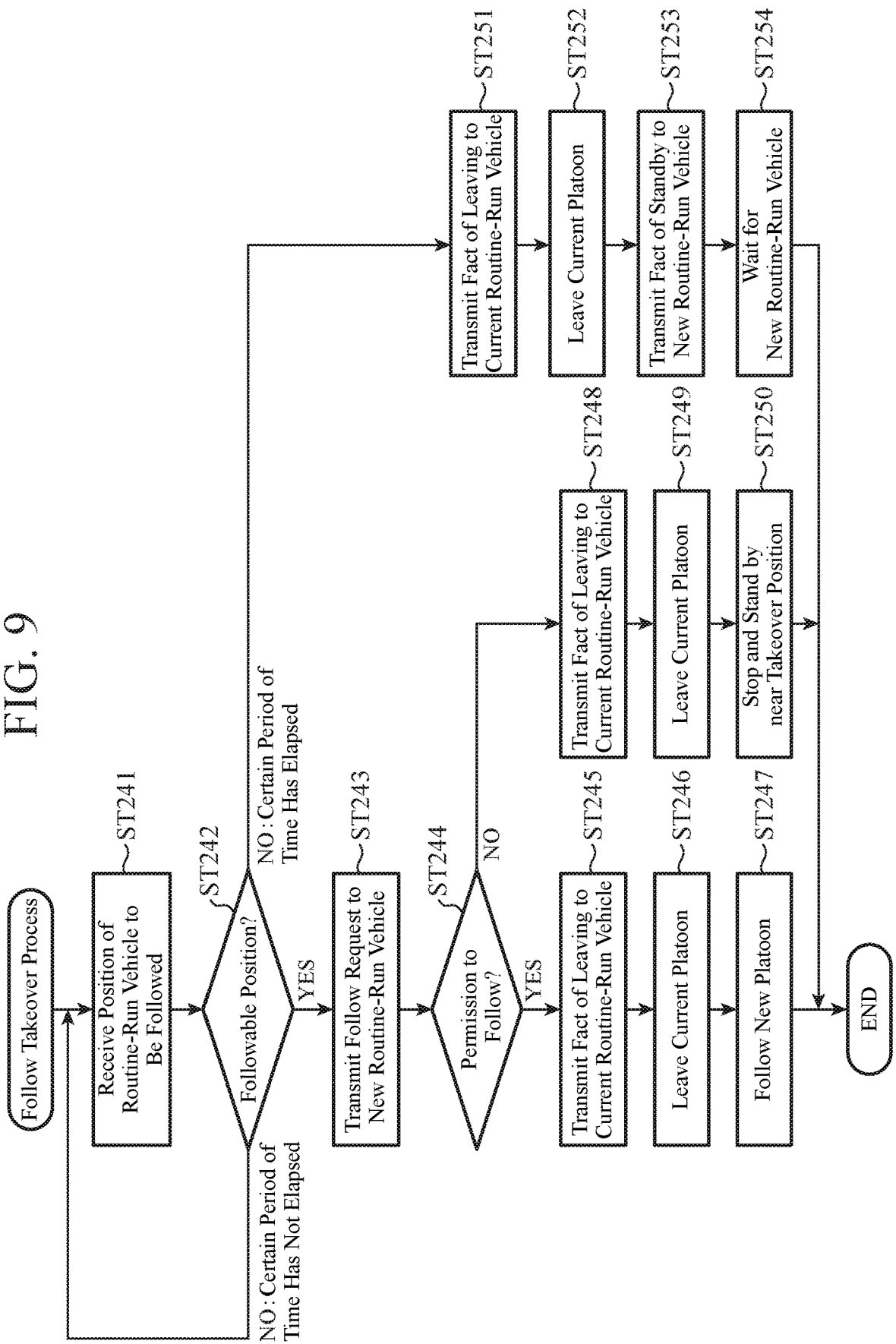
FIG. 9 is a flowchart of a follow takeover process (step ST202 in FIG. 5 and step ST234 in FIG. 8) performed by the following-vehicle control device.

FIG. 9 is a flowchart of the follow takeover process (step ST204 in FIG. 5 and step ST234 in FIG. 8) performed by the following-vehicle control device 200.

In step ST241, the vehicle-outside communication unit 201 receives position information of a routine-run vehicle that the user vehicle 11 is going to newly follow from the server 300 for management. In step ST242, the follow processing unit 204 refers to the routine-run vehicle data 206 and determines whether or not the position of the routine-run vehicle to be newly followed is a followable position. For example, in a case where the user vehicle 11 is currently following the routine-run vehicle 4 and is going to follow the routine-run vehicle 6, if the position of the routine-run vehicle 6 to be newly followed is within 50 m of the takeover position 14, the follow processing unit 204 determines that the routine-run vehicle 6 is at the followable position.

If the position of the routine-run vehicle to be newly followed is the followable position (step ST242 "YES"), the follow processing unit 204 transmits a follow request to the routine-run-vehicle control device 100 mounted on the routine-run vehicle to be newly followed via the inter-vehicle communication unit 202 (step ST243). The follow processing unit 204 then waits for a response from the following-vehicle control device 200 (step ST244).

If the inter-vehicle communication unit 202 receives the response of permission to follow from the routine-run-vehicle control device 100 mounted on the routine-run vehicle to be newly followed (step ST244 "YES"), the follow processing unit 204 transmits the fact of leaving to the routine-run-vehicle control device 100 mounted on the currently followed routine-run vehicle via the inter-vehicle communication unit 202 (step ST245). In step ST246, the follow processing unit 204 instructs the vehicle control unit 203 to end following and leave the current platoon. In step ST247, the follow processing unit 204 instructs the vehicle control unit 203 to start following the routine-run vehicle to be newly followed. Based on a designated position included in the response of permission to follow, the vehicle control unit 203 moves to the designated position (for example, the end of the line) in a platoon with the routine-run vehicle at the head, and starts following. Since the takeover is completed, the user vehicle 11 transitions from the follow takeover state in step ST204 to the follow state in step ST203.

If the inter-vehicle communication unit 202 receives the response of refusal to follow from the routine-run-vehicle control device 100 mounted on the routine-run vehicle to be newly followed (step ST244 "NO"), the follow processing unit 204 transmits the fact of leaving to the routine-run-vehicle control device 100 mounted on the currently followed routine-run vehicle via the inter-vehicle communication unit 202 (step ST248). In step ST249, the follow processing unit 204 instructs the vehicle control unit 203 to end following and leave the current platoon. In step ST250, the follow processing unit 204 instructs the vehicle control unit 203 to stop and stand by at a position around the takeover position, where the vehicle can stop. Since the user vehicle 11 ends following, the user vehicle 11 transitions to the idle state in step ST200.

If a certain period of time (for example, 30 seconds) has elapsed without the routine-run vehicle to be newly followed coming to the followable position (step ST242 "NO: certain period of time has elapsed"), the process of the following-vehicle control device 200 proceeds to step ST251, and if the certain period of time has not elapsed (step ST242 "NO: certain period of time has not elapsed"), the process of the following-vehicle control device 200 returns to step ST241. In steps ST251 to ST254, since there is a high possibility that the routine-run vehicle to be newly followed cannot arrive at the takeover position on time, the user vehicle 11 stops and stands by around the takeover position. In step ST251, the follow processing unit 204 transmits the fact of leaving to the routine-run-vehicle control device 100 mounted on the routine-run vehicle that is currently being followed via the inter-vehicle communication unit 202. In step ST252, the follow processing unit 204 instructs the vehicle control unit 203 to end following and leave the current platoon. In step ST253, the follow processing unit 204 transmits the fact of standby to the routine-run vehicle to be newly followed via the vehicle-outside communication unit 201 through the server 300 for management. In step ST254, the follow processing unit 204 instructs the vehicle control unit 203 to stop and stand by at the position around the takeover position, where the vehicle can stop. The user vehicle 11 transitions from the follow takeover state in step ST203 to the follow waiting state in step ST202.

When arriving at the destination 12, the user vehicle 11 transitions from the follow state in step ST203 to the destination arrival state in step ST205. The following-vehicle control device 200 performs a destination arrival process of FIG. 10.

Figure 10:
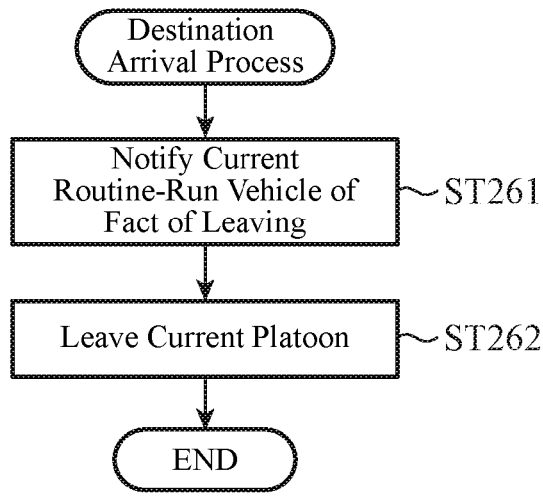
FIG. 10 is a flowchart of a destination arrival process (step ST205 in FIG. 5 and step ST236 in FIG. 8) performed by the following-vehicle control device.

FIG. 10 is a flowchart of the destination arrival process (step ST205 in FIG. 5 and step ST236 in FIG. 8) performed by the following-vehicle control device 200.

In step ST261, the follow processing unit 204 transmits the fact of leaving to the routine-run-vehicle control device 100 mounted on the routine-run vehicle that is currently being followed via the inter-vehicle communication unit 202. In step ST262, the follow processing unit 204 instructs the vehicle control unit 203 to end following and leave the current platoon. The user vehicle 11 transitions from the destination arrival state in step ST205 to the idle state in step ST200.

FIG. 11 is a state transition diagram of a routine-run vehicle in the first embodiment.

The idle state in step ST100 is a state where the routine-run vehicle does not perform routine-run driving. When it is the operation start time included in routine-run-vehicle reservation data received from the server 300 for management, the state of the routine-run vehicle transitions from the idle state in step ST100 to a routine-run driving state in step ST101. The routine-run-vehicle control device 100 performs a routine-run driving process of FIG. 12.

Figure 12:
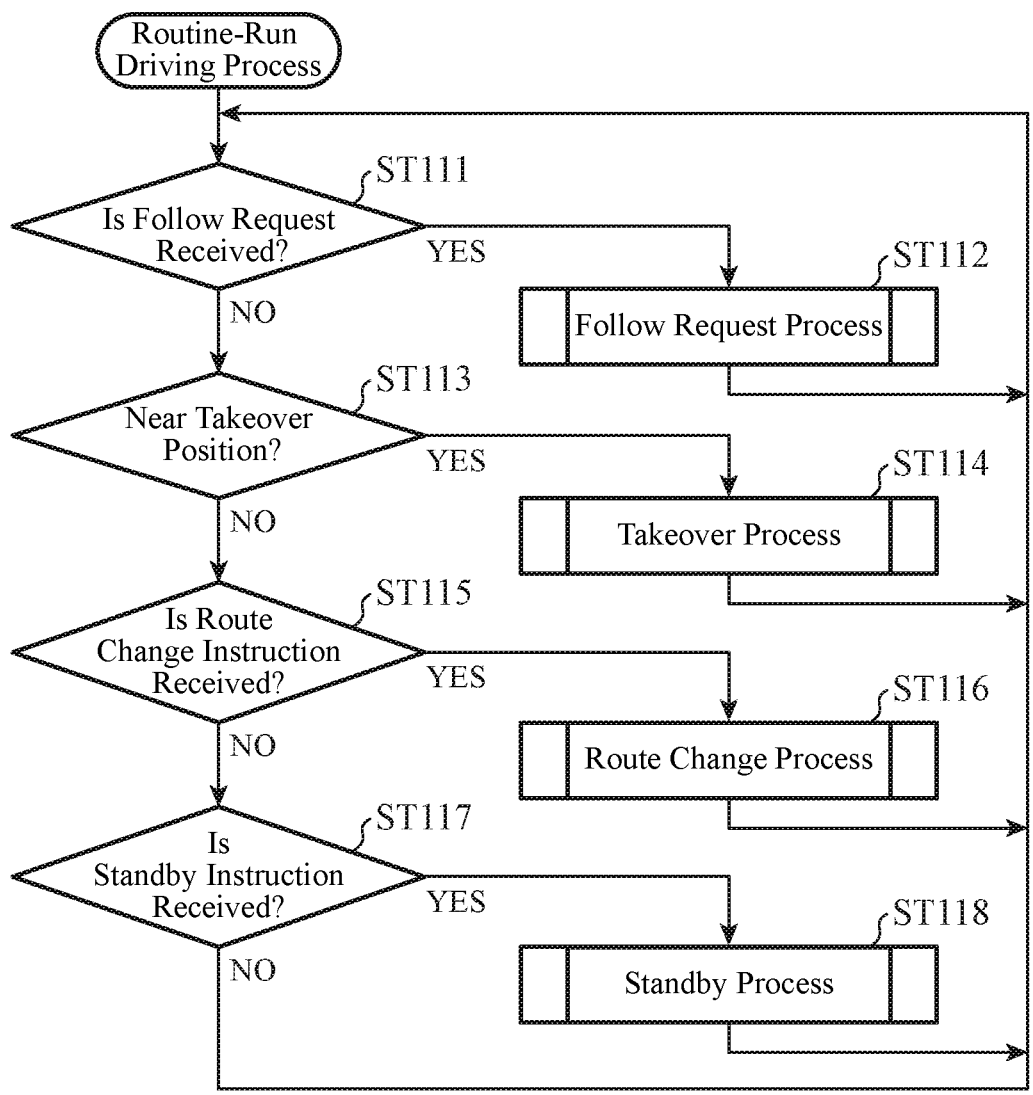
FIG. 12 is a flowchart of a routine-run driving process (step ST100 in FIG. 11) performed by the routine-run-vehicle control device.

FIG. 12 is a flowchart of the routine-run driving process (step ST100 in FIG. 11) performed by the routine-run-vehicle control device 100. In the routine-run driving process, the route guide unit 108 instructs the vehicle control unit 103 to operate on a routine-run route based on the route data 105.

In step ST111, some message is received from the server 300 for management via the vehicle-outside communication unit 101 or from a following vehicle via the inter-vehicle communication unit 102. If the inter-vehicle communication unit 102 receives "follow request" from the following vehicle (step ST111 "YES"), the process of the routine-run-vehicle control device 100 transitions to step ST112, and otherwise (step ST111 "NO"), the process transitions to step ST113.

In step ST113, if the current position information of the routine-run vehicle acquired by the position acquisition unit 104 is near a takeover position (for example, within 50 m of the takeover position) (step ST113 "YES"), the process of the routine-run-vehicle control device 100 transitions to step ST114, and otherwise (step ST113 "NO"), the process transitions to step ST115.

In step ST115, if the vehicle-outside communication unit 101 receives "route change instruction" from the server 300 for management (step ST115 "YES"), the process of the routine-run-vehicle control device 100 transitions to step ST116, and otherwise (step ST115 "NO"), the process transitions to step ST117.

In step ST117, if the vehicle-outside communication unit 101 receives "standby instruction" from the server 300 for management (step ST117 "YES"), the process of the routine-run-vehicle control device 100 transitions to step ST118, and otherwise (step ST117 "NO"), the process returns to step ST111.

Figure 13:
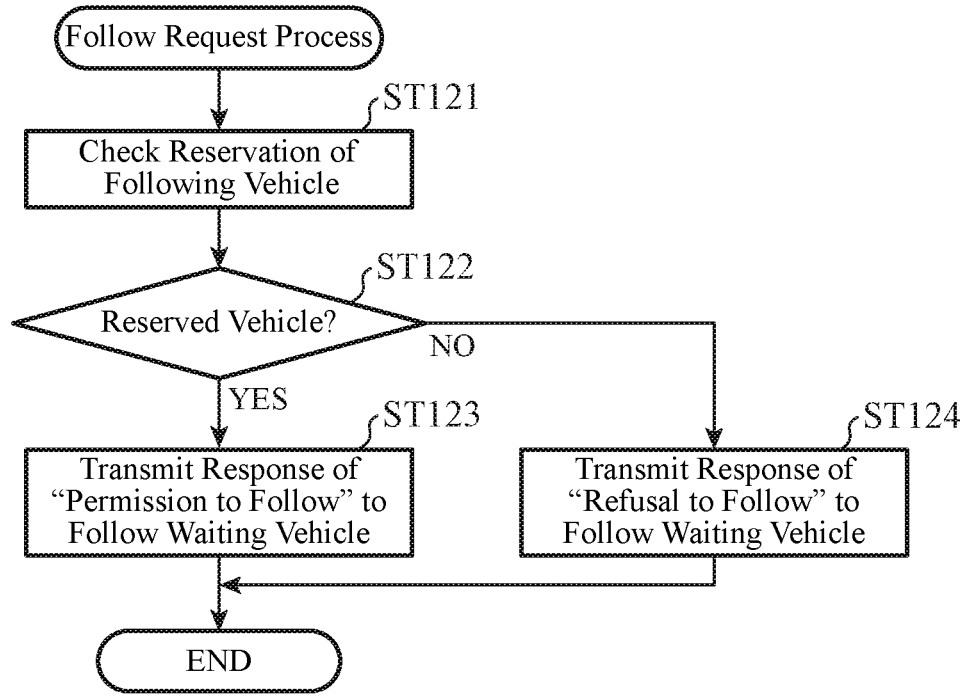
FIG. 13 is a flowchart of a follow request process (step ST112 in FIG. 12) performed by the routine-run-vehicle control device.

FIG. 13 is a flowchart of the follow request process (step ST112 in FIG. 12) performed by the routine-run-vehicle control device 100. With the start of the follow request process, the routine-run vehicle transitions from the routine-run driving state in step ST101 to the following-vehicle adding state in step ST103.

In step ST121, the following-vehicle management unit 110 determines whether or not the surrounding vehicle that has transmitted the follow request is a following vehicle included in the reservation data 106. If the identification information of the surrounding vehicle that has transmitted the follow request matches the identification information of the following vehicle included in the reservation data 106 (step ST122 "YES"), the following-vehicle management unit 110 determines that the surrounding vehicle is a following vehicle that is going to follow the host routine-run vehicle, and transmits "permission to follow" to the following vehicle via the inter-vehicle communication unit 102 (step ST123). In addition, the following-vehicle management unit 110 manages, as the following vehicle data 107, reservation data 106 related to the following vehicle to which "permission to follow" has been transmitted among the reservation data 106 managed by the follow-reservation management unit 109. For example, the routine-run vehicle 4 receives "follow request" from the user vehicle 11 at the home 10 as the departure place, and transmits "permission to follow" to the user vehicle 11. The routine-run vehicle 6 receives "follow request" from the user vehicle 11 at the takeover position 14, and transmits "permission to follow" to the user vehicle 11. The routine-run vehicle 8 receives "follow request" from the user vehicle 11 at the takeover position 15, and transmits "permission to follow" to the user vehicle 11.

On the other hand, if the identification information of the surrounding vehicle that has transmitted the follow request does not match the identification information of the following vehicle included in the reservation data 106 (step ST122 "NO"), the following-vehicle management unit 110 determines that the surrounding vehicle is not a reserved vehicle, and transmits "refusal to follow" to the surrounding vehicle via the inter-vehicle communication unit 102. Since the follow request process is completed, the state of the routine-run vehicle transitions from the following-vehicle adding state in step ST103 to the routine-run driving state in step ST101.

Figure 14:
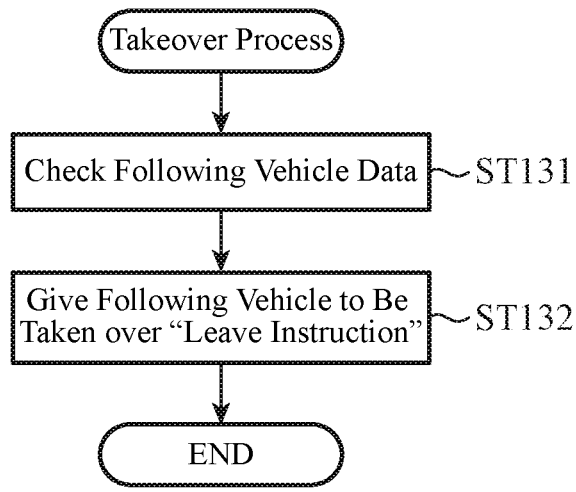
FIG. 14 is a flowchart of a takeover process (step ST114 in FIG. 12) performed by the routine-run-vehicle control device.

FIG. 14 is a flowchart of the takeover process (step ST114 in FIG. 12) performed by the routine-run-vehicle control device 100. With the start of the takeover process, the routine-run vehicle transitions from the routine-run driving state in step ST101 to the following-vehicle leaving state in step ST102.

In step ST131, the following-vehicle management unit 110 refers to the following vehicle data 107, and checks information of a following vehicle that is going to leave the host routine-run vehicle at a takeover position and follow another routine-run vehicle. In step ST132, the following-vehicle management unit 110 transmits "leave instruction" to the following vehicle via the inter-vehicle communication unit 102. In addition, the following-vehicle management unit 110 deletes following vehicle data 107 related to the following vehicle to which "leave instruction" has been transmitted among the following vehicle data 107 managed by the following-vehicle management unit 110. Alternatively, the following-vehicle management unit 110 can store the following vehicle data 107 as data (that is, the history) of a vehicle that has completed a takeover without deleting the following vehicle data 107. Since the takeover process is completed, the state of the routine-run vehicle transitions from the following-vehicle leaving state in step ST102 to the routine-run driving state in step ST101. For example, the routine-run vehicle 4 transmits "leave instruction" to the user vehicle 11 following the routine-run vehicle 4 at the takeover position 14, and delivers the user vehicle 11 to the routine-run vehicle 6. The routine-run vehicle 6 transmits "leave instruction" to the user vehicle 11 following the routine-run vehicle 6 at the takeover position 15, and delivers the user vehicle 11 to the routine-run vehicle 8.

Figure 15:
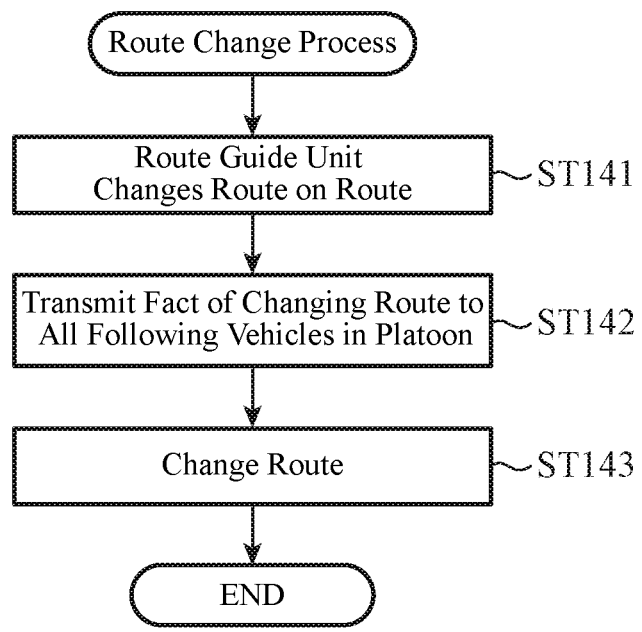
FIG. 15 is a flowchart of a route change process (step ST116 in FIG. 12) performed by the routine-run-vehicle control device.

FIG. 15 is a flowchart of the route change process (step ST116 in FIG. 12) performed by the routine-run-vehicle control device 100. While the routine-run-vehicle control device 100 performs the route change process, the routine-run vehicle is in the routine-run driving state in step ST101.

In step ST141, the vehicle-outside communication unit 101 outputs information of a routine-run route included in "route change instruction" received from the server 300 for management to the route guide unit 108. The route guide unit 108 changes the stored route data 105 to a new routine-run route received from the server 300 for management. In step ST142, the route guide unit 108 transmits the fact of changing the routine-run route to all the following vehicles that are following the host routine-run vehicle via the inter-vehicle communication unit 102. In step ST143, the route guide unit 108 gives an instruction to the vehicle control unit 103 using the changed route data 105.

Figure 16:
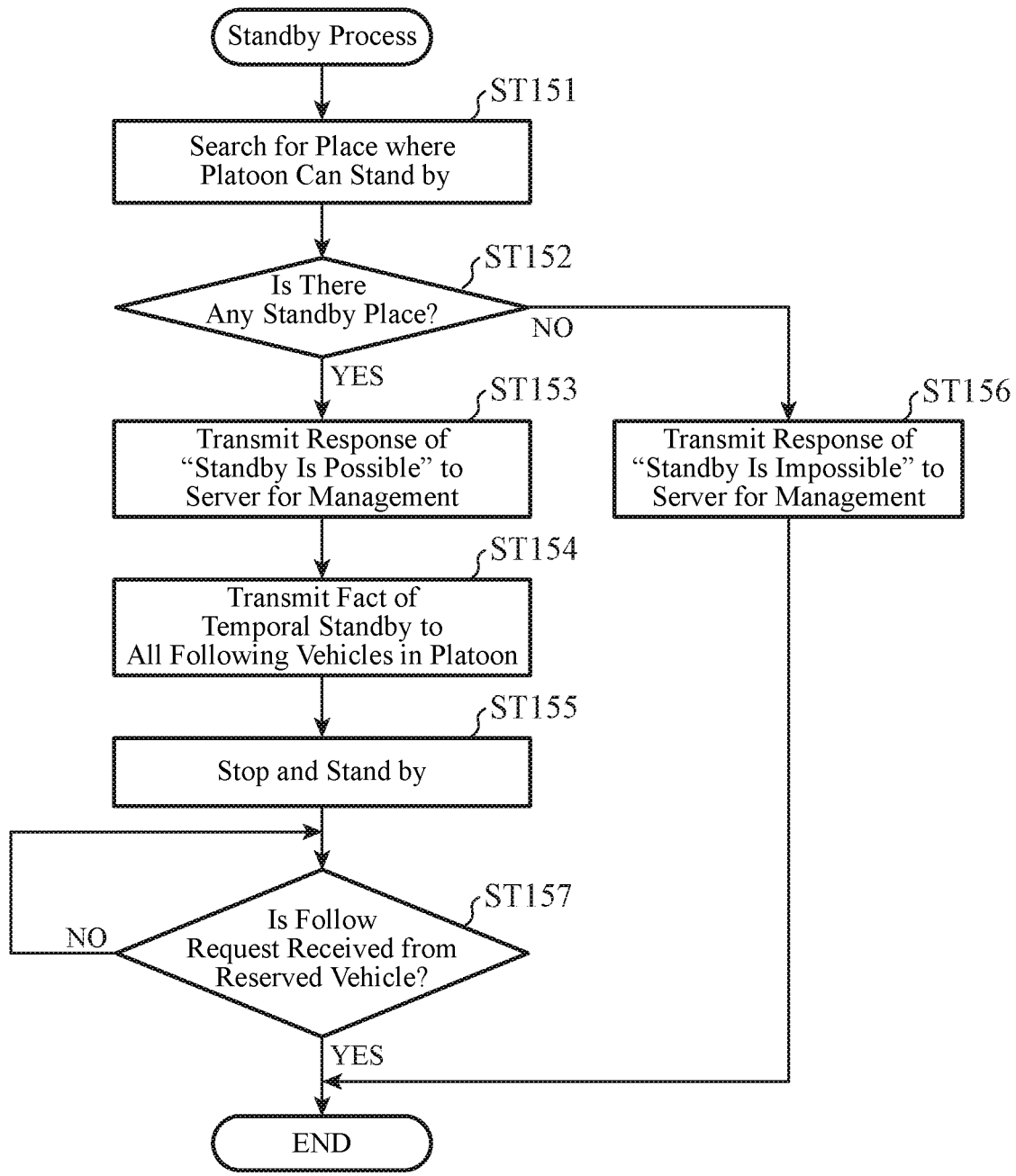
FIG. 16 is a flowchart of a standby process (step ST118 in FIG. 12) performed by the routine-run-vehicle control device.

FIG. 16 is a flowchart of the standby process (step ST118 in FIG. 12) performed by the routine-run-vehicle control device 100.

In step ST151, the route guide unit 108 searches for a place where the platoon can stand by on the routine-run route indicated by the route data 105. Alternatively, the route guide unit 108 can search for a place where the platoon can stand by around the takeover position in advance. If there is a place where standby is possible (step ST152 "YES"), the process of the route guide unit 108 transitions to step ST153, and if there is no place where standby is possible (step ST152 "NO"), the process transitions to step ST156.

In step ST153, the route guide unit 108 transmits a response of "standby is possible" to the server 300 for management via the vehicle-outside communication unit 101. In step ST154, the route guide unit 108 instructs all the following vehicles that are following the host routine-run vehicle to temporarily stand by via the inter-vehicle communication unit 102. In step ST155, the route guide unit 108 instructs the vehicle control unit 103 to move to and stop at the standby place. Since the platoon is in standby, the state of the routine-run vehicle transitions from the routine-run driving state in step ST101 to the platoon standby state in step ST104. The routine-run-vehicle control device 100 then waits for "follow request" from a surrounding vehicle that is going to follow the host routine-run vehicle (step ST157 "NO"). If the inter-vehicle communication unit 102 receives "follow request" from the surrounding vehicle (step ST157 "YES"), the route guide unit 108 cancels the standby state and restarts routine-run driving. The state of the routine-run vehicle transitions from the platoon standby state in step ST104 to the routine-run driving state in step ST101.

On the other hand, if there is no place where standby is possible (step ST152 "NO"), the route guide unit 108 transmits a response of "standby is impossible" to the server 300 for management via the vehicle-outside communication unit 101 (step ST156). In this case, the route guide unit 108 continues routine-run driving by instructing the vehicle control unit 103 to operate on the routine-run route based on the route data 105.

Next, the operation of the server 300 for management will be described.

Figure 17:
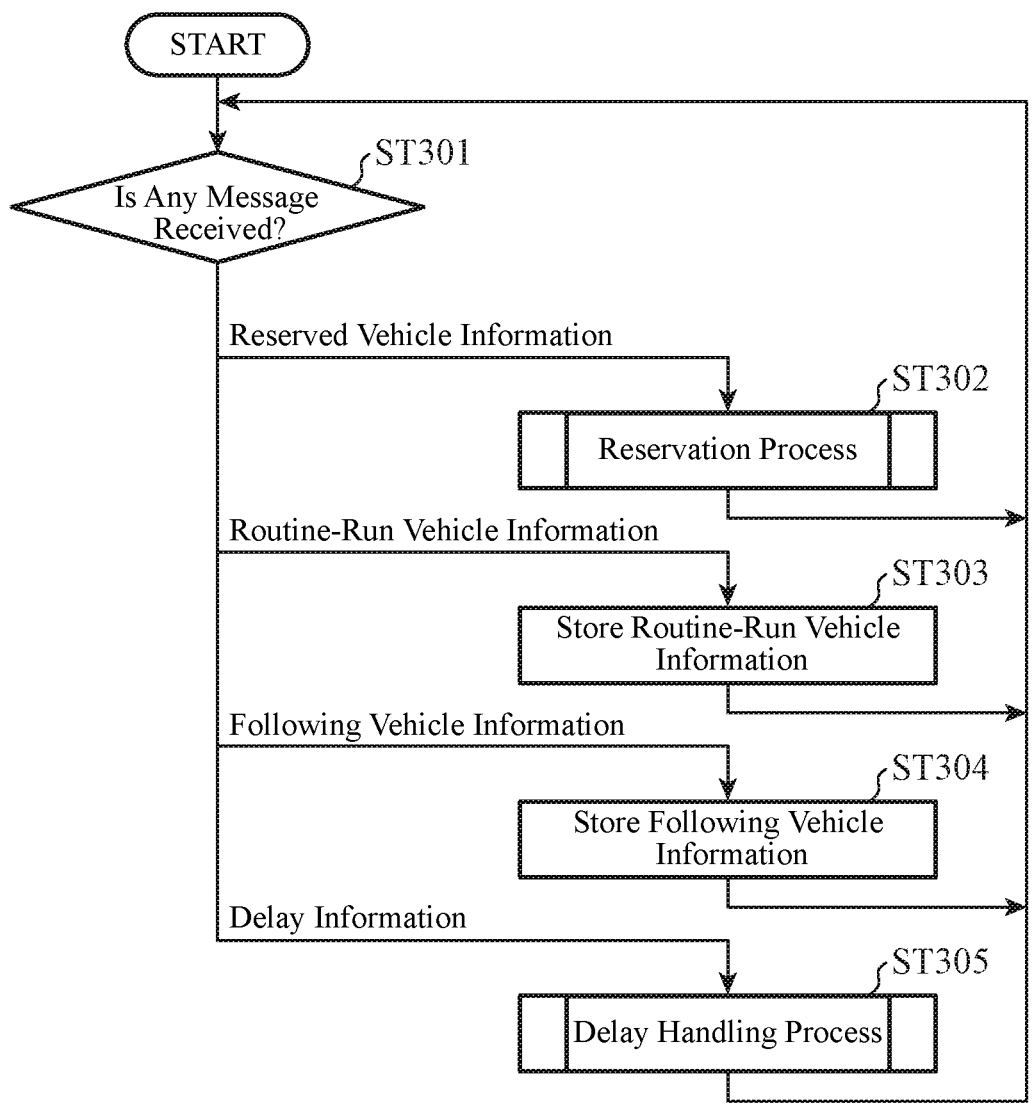
FIG. 17 is a flowchart illustrating a main process of the server for management in the first embodiment.

FIG. 17 is a flowchart illustrating a main process of the server 300 for management in the first embodiment.

In step ST301, the communication unit 301 receives some message from the routine-run-vehicle control device 100 mounted on a routine-run vehicle or the following-vehicle control device 200 mounted on the user vehicle 11 as a following vehicle. If the communication unit 301 receives "reserved vehicle information" from the user vehicle 11, the process of the server 300 for management transitions to step ST302.

If the communication unit 301 receives "routine-run vehicle information" from the routine-run vehicle, the routine-run-vehicle management unit 306 stores the received information as the routine-run vehicle data 307 in step ST303. The routine-run vehicle information includes identification information, position information, and the like of the routine-run vehicle.

If the communication unit 301 receives "following vehicle information" from the following vehicle, the following-vehicle management unit 308 stores the received information as the following vehicle data 309 in step ST304. The following vehicle information includes identification information, position information, and the like of the following vehicle.

If the communication unit 301 receives "delay information" from the routine-run vehicle, the process of the server 300 for management transitions to step ST305.

Note that in a case where it is predicted that the takeover-side routine-run vehicle cannot arrive on time at the takeover position stored in the reservation data 106 held by the takeover-side routine-run-vehicle control device 100, the delay information is transmitted from the vehicle-outside communication unit 101 of the takeover-side routine-run-vehicle control device 100 to the server 300 for management. In addition, also in a case where it is predicted that the delivery-side routine-run vehicle cannot arrive on time at the takeover position stored in the reservation data 106 held by the delivery-side routine-run-vehicle control device 100, the delay information is transmitted from the vehicle-outside communication unit 101 of the delivery-side routine-run-vehicle control device 100 to the server 300 for management. The route guide unit 108 can predict whether or not the vehicle can arrive on time at the takeover position. Since a well-known technique can be used for a prediction method, the description thereof will be omitted.

Figure 18:
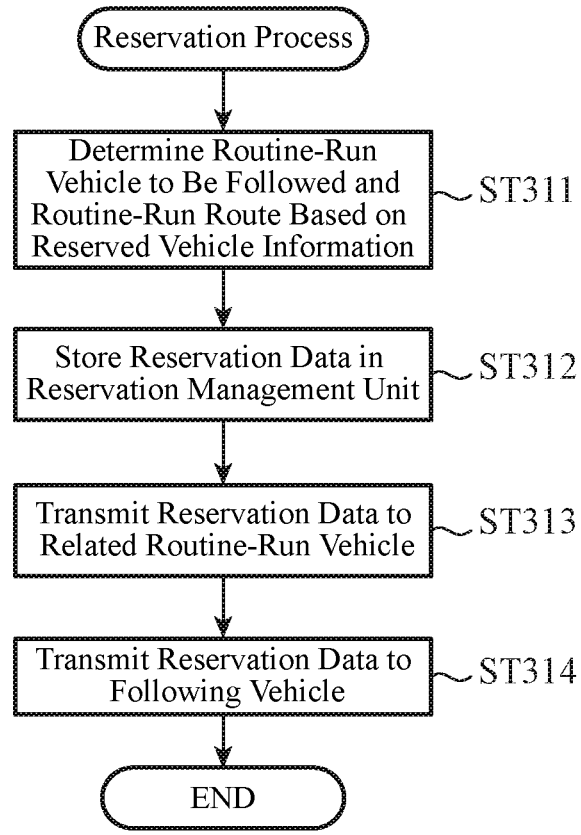
FIG. 18 is a flowchart of a reservation process (step ST302 in FIG. 17) performed by the server for management.

FIG. 18 is a flowchart of the reservation process (step ST302 in FIG. 17) performed by the server 300 for management.

In step ST311, the routine-run-vehicle determination unit 302 and the route determination unit 303 determine the routine-run vehicle to be followed by the following vehicle that has transmitted the reserved vehicle information in step ST301, and the routine-run route on which the routine-run vehicle operates, by a method to be described later.

In step ST312, the reservation management unit 304 stores the contents determined by the routine-run-vehicle determination unit 302 and the route determination unit 303 as the reservation data 305. In step ST313, the reservation management unit 304 transmits the reservation data 305 for the routine-run vehicle to the routine-run-vehicle control device 100 mounted on the routine-run vehicle determined by the routine-run-vehicle determination unit 302 via the communication unit 301. In step ST314, the reservation management unit 304 transmits the reservation data 305 for the following vehicle to the following vehicle having transmitted the reserved vehicle information in step ST301 via the communication unit 301.

Figure 19:
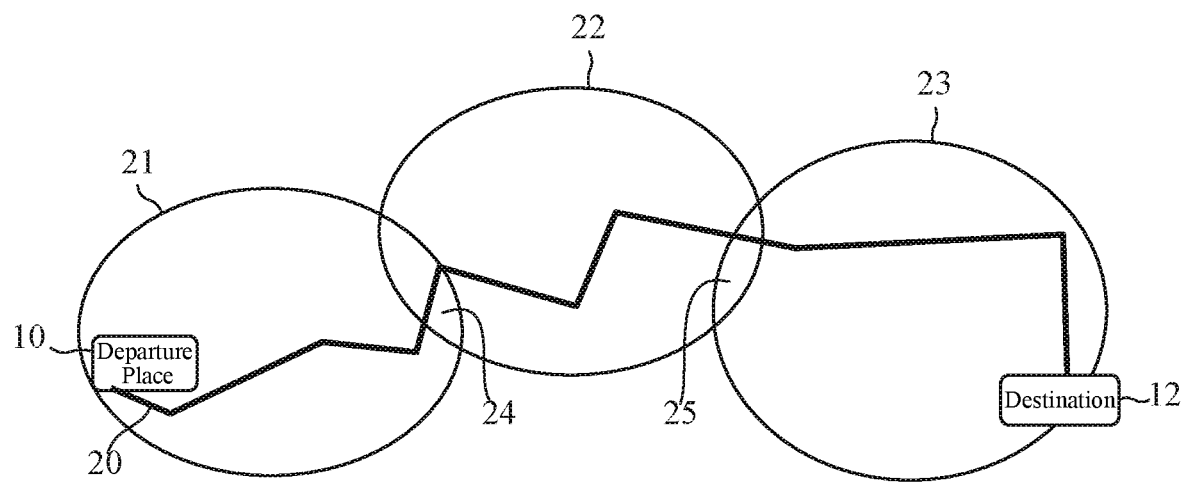
FIG. 19 is a diagram for explaining a routine-run-vehicle determination process (step ST311 in FIG. 18) performed by the server for management.

FIG. 19 is a diagram for explaining a routine-run-vehicle determination process (step ST311 in FIG. 18) performed by the server 300 for management. The routine-run-vehicle determination unit 302 determines a route 20 from the home 10 to the destination 12 by using reserved vehicle information received from the user vehicle 11. The routine-run-vehicle determination unit 302 determines the routine-run vehicle routine-running on the route 20 so that a routine-run area 21 and a routine-run area 22, which are adjacent to each other, overlap, and the routine-run area 22 and a routine-run area 23, which are adjacent to each other, overlap. A portion that the routine-run area 21 and the routine-run area 22 overlap is a candidate 24 for a takeover position, and a portion that the routine-run area 22 and the routine-run area 23 overlap each other is a candidate 25 for a takeover position. Although not illustrated in the drawing, it is assumed that the routine-run vehicle 4 is in charge of the routine-run area 21, the routine-run vehicle 6 is in charge of the routine-run area 22, and the routine-run vehicle 8 is in charge of the routine-run area 23.

The routine-run areas 21, 22, and 23 assigned to three routine-run vehicles are not clearly defined areas but reference areas in determining the candidates for a takeover position. For example, in a case where the routine-run area 22 and the routine-run area 23 do not overlap each other, the routine-run-vehicle determination unit 302 can perform adjustment such as enlarging at least one of the routine-run area 22 or the routine-run area 23. In addition, in a case where the number of routine-run vehicles operating in the routine-run areas 21, 22, and 23 is reduced because of a small number of following vehicles that are going to travel in the routine-run areas 21, 22, and 23, the routine-run-vehicle determination unit 302 can perform adjustment such as enlarging the routine-run areas 21, 22, and 23. On the other hand, in a case where the number of routine-run vehicles operating in the routine-run areas 21, 22, and 23 is increased because of a large number of following vehicles that are going to travel in the routine-run areas 21, 22, and 23, the routine-run-vehicle determination unit 302 can perform adjustment such as reducing the routine-run areas 21, 22, and 23. For example, the routine-run-vehicle determination unit 302 enlarges or reduces the size of the routine-run areas 21, 22, and 23 so that the number of following vehicles that are going to travel in the routine-run areas 21, 22, and 23 falls within a predetermined number (for example, five). When the routine-run areas 21, 22, and 23 are enlarged so that the routine-run area 21 and the routine-run area 23 overlap, the routine-run area 22 is unnecessary, so that the routine-run vehicle in charge of the routine-run area 22 is unnecessary accordingly, and thus the number of routine-run vehicles can be reduced.

In addition, for example, the routine-run-vehicle determination unit 302 may perform adjustment to increase or reduce the number of routine-run vehicles to be operated in one routine-run area so that the number of following vehicles that are going to follow one routine-run vehicle is within a predetermined number.

Figure 20:
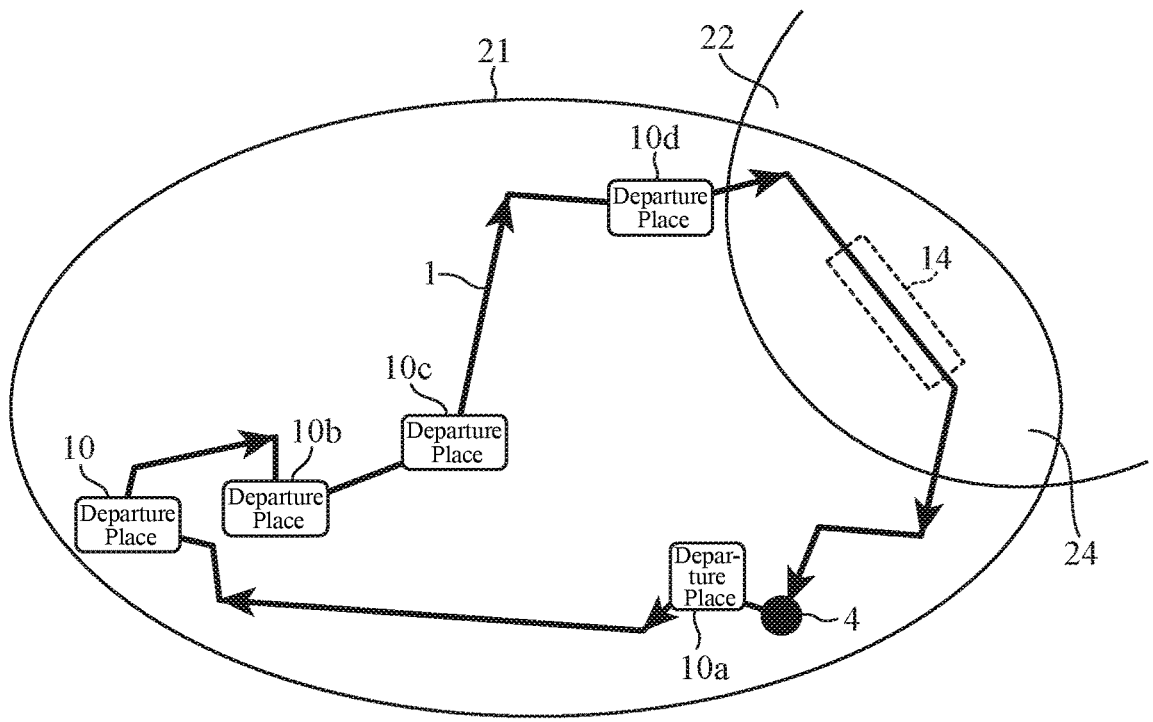
FIG. 20 is a diagram for explaining a routine-run-route determination process (step ST313 in FIG. 18) performed by the server for management.

FIG. 20 is a diagram for explaining a routine-run-route determination process (step ST313 in FIG. 18) performed by the server 300 for management. The route determination unit 303 determines the routine-run route 1 of the routine-run vehicle 4 that can be followed by the user vehicle 11 (not illustrated) whose departure place (the home 10) is in the routine-run area 21 of the routine-run vehicle 4 determined by the routine-run-vehicle determination unit 302 and other following vehicles whose departure places 10a, 10b, 10c, and 10d are also in the routine-run area 21. In this case, the routine-run-vehicle determination unit 302 causes the routine-run route 1 of the routine-run vehicle 4 to pass through the candidate 24 for a takeover position. The routine-run-vehicle determination unit 302 then determines, as the takeover position 14 of the user vehicle 11, the candidate 24 for a takeover position overlapping the adjacent routine-run area 22 in the routine-run route 1. In addition, the routine-run-vehicle determination unit 302 determines a takeover time when the routine-run vehicle 4 arrives at the takeover position 14 by using the position information of the routine-run vehicle 4 and the like.

The route determination unit 303 also performs a process similar to the process for the routine-run area 21 on the routine-run area 22 and the routine-run area 23, and determines the routine-run route 2 of the routine-run vehicle 6, the routine-run route 3 of the routine-run vehicle 8, and the like. Specifically, the vehicle control unit 203 determines the routine-run route 2 of the routine-run vehicle 6 that can be followed by another following vehicle whose departure place is in the routine-run area 22. In this case, the routine-run-vehicle determination unit 302 causes the routine-run route 2 of the routine-run vehicle 6 to pass through the candidates 24 and 25 for a takeover position. The routine-run-vehicle determination unit 302 then determines the candidate 24 for a takeover position overlapping the adjacent routine-run area 21 in the routine-run route 2 as the takeover position 14 of the user vehicle 11, and determines the candidate 25 for a takeover position overlapping the adjacent routine-run area 22 in the routine-run route 2 as the takeover position 15 of the user vehicle 11. In addition, the routine-run-vehicle determination unit 302 determines takeover times when the routine-run vehicle 6 arrives at the takeover positions 14 and 15 by using the position information of the routine-run vehicle 6 and the like.

Figure 21:
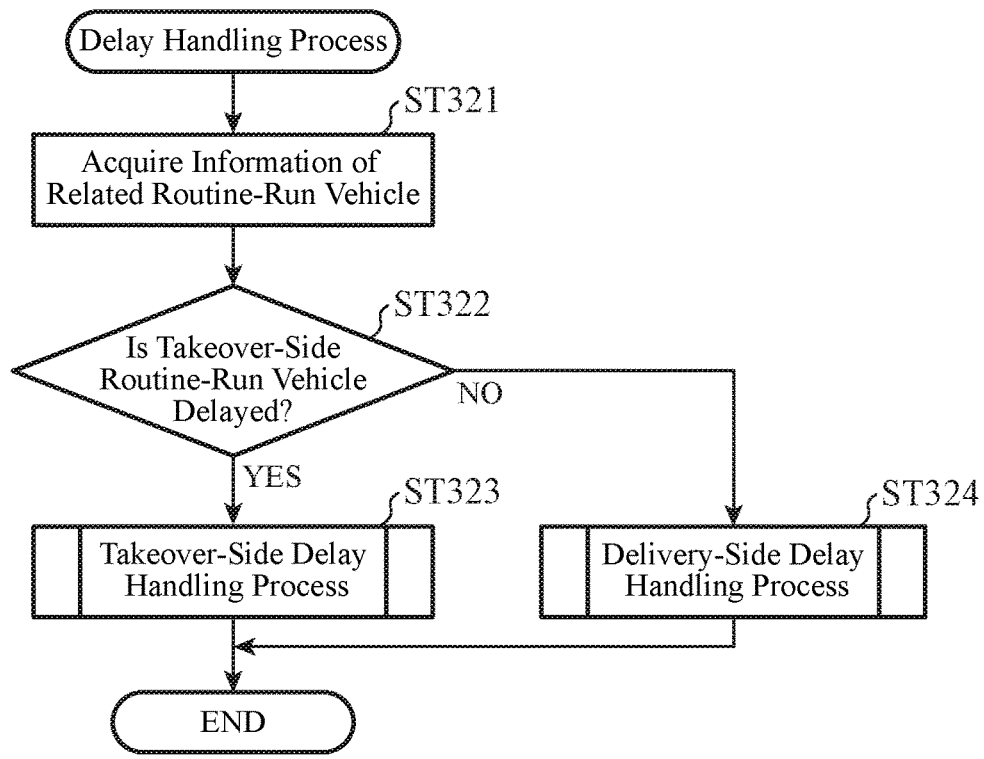
FIG. 21 is a flowchart of a delay handling process (step ST305 in FIG. 17) performed by the server for management.

FIG. 21 is a flowchart of a delay handling process (step ST305 in FIG. 17) performed by the server 300 for management.

In step ST321, the route determination unit 303 acquires routine-run vehicle information (position information and the like) related to the delay information received by the communication unit 301 from the routine-run vehicle data 307 managed by the routine-run-vehicle management unit 306. For example, in a case where the takeover-side routine-run vehicle transmits the delay information, the route determination unit 303 acquires, from the routine-run vehicle data 307, information of the takeover-side routine-run vehicle and information of a delivery-side routine-run vehicle that is going to take over the following vehicle from the takeover-side routine-run vehicle. Furthermore, for example, in a case where the delivery-side routine-run vehicle transmits the delay information, the route determination unit 303 acquires, from the routine-run vehicle data 307, information of the delivery-side routine-run vehicle and information of a takeover-side routine-run vehicle that is going to take over the following vehicle from the delivery-side routine-run vehicle. In addition, the route determination unit 303 acquires routine-run-vehicle reservation data related to the delay information received by the communication unit 301 from the reservation data 305 managed by the reservation management unit 304.

In step ST322, the route determination unit 303 determines whether or not the routine-run vehicle taking over the following vehicle is delayed by using the current position information, the takeover position, and the takeover time of the routine-run vehicle acquired in step ST321. If the takeover-side routine-run vehicle is delayed (step ST322 "YES"), the process of the route determination unit 303 transitions to step ST323, and if the delivery-side routine-run vehicle is delayed (step ST322 "NO"), the process of the route determination unit 303 transitions to step ST324. In FIG. 1, in a case where the user vehicle 11 follows the routine-run vehicle 4, the routine-run vehicle 4 is a delivery-side routine-run vehicle, and the routine-run vehicle 6 is a takeover-side routine-run vehicle.

Figure 22:
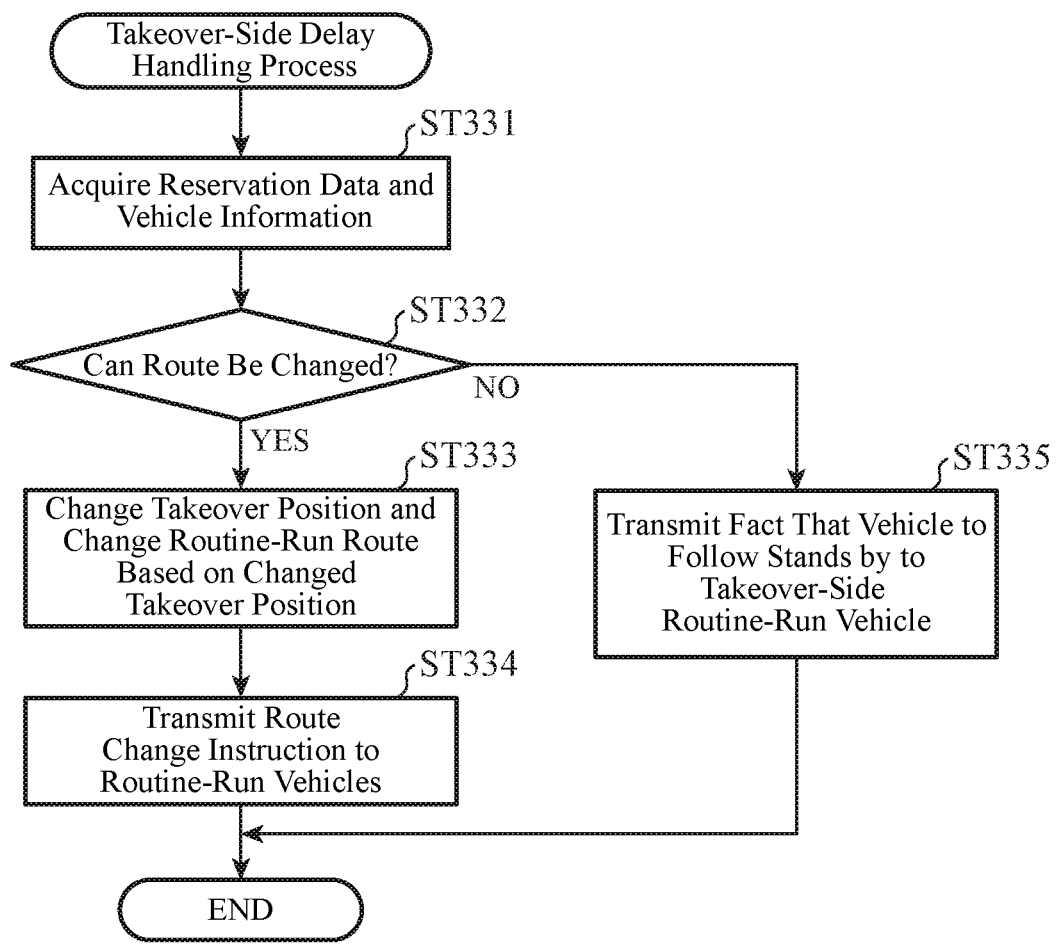
FIG. 22 is a flowchart of a takeover-side delay-handling process (step ST323 in FIG. 21) performed by the server for management.

FIG. 22 is a flowchart of the takeover-side delay-handling process (step ST323 in FIG. 21) performed by the server 300 for management.

In step ST331, the route determination unit 303 acquires reservation data, current position information, and the like related to a delivery-side routine-run vehicle and a takeover-side routine-run vehicle from the reservation data 305, the routine-run-vehicle management unit 306, and the routine-run vehicle data 307.

In step ST332, the route determination unit 303 determines whether or not the routine-run route of the takeover-side routine-run vehicle can be changed by using the various types of information acquired in step ST331. If the routine-run route can be changed (step ST332 "YES"), the process of the route determination unit 303 transitions to step ST333, and if the routine-run route cannot be changed (step ST332 "NO"), the process of the route determination unit 303 transitions to step ST335.

In step ST333, the route determination unit 303 changes the takeover position at which the following vehicle is taken over from the delivery-side routine-run vehicle to the takeover-side routine-run vehicle, and changes the delivery-side routine-run route and the takeover-side routine-run route based on the changed takeover position. In step ST334, the route determination unit 303 transmits, via the communication unit 301, a route change instruction including the changed routine-run route to the routine-run-vehicle control device 100 mounted on the delivery-side routine-run vehicle and the routine-run-vehicle control device 100 mounted on the takeover-side routine-run vehicle.

If the routine-run route of the takeover-side routine-run vehicle cannot be changed, the following vehicle following the delivery-side routine-run vehicle stops around the takeover position and waits until the takeover-side routine-run vehicle comes to the takeover position. For this reason, in step ST335, the route determination unit 303 transmits the fact that the following vehicle to follow waits at the takeover position to the routine-run-vehicle control device 100 mounted on the takeover-side routine-run vehicle via the communication unit 301.

Figure 23:
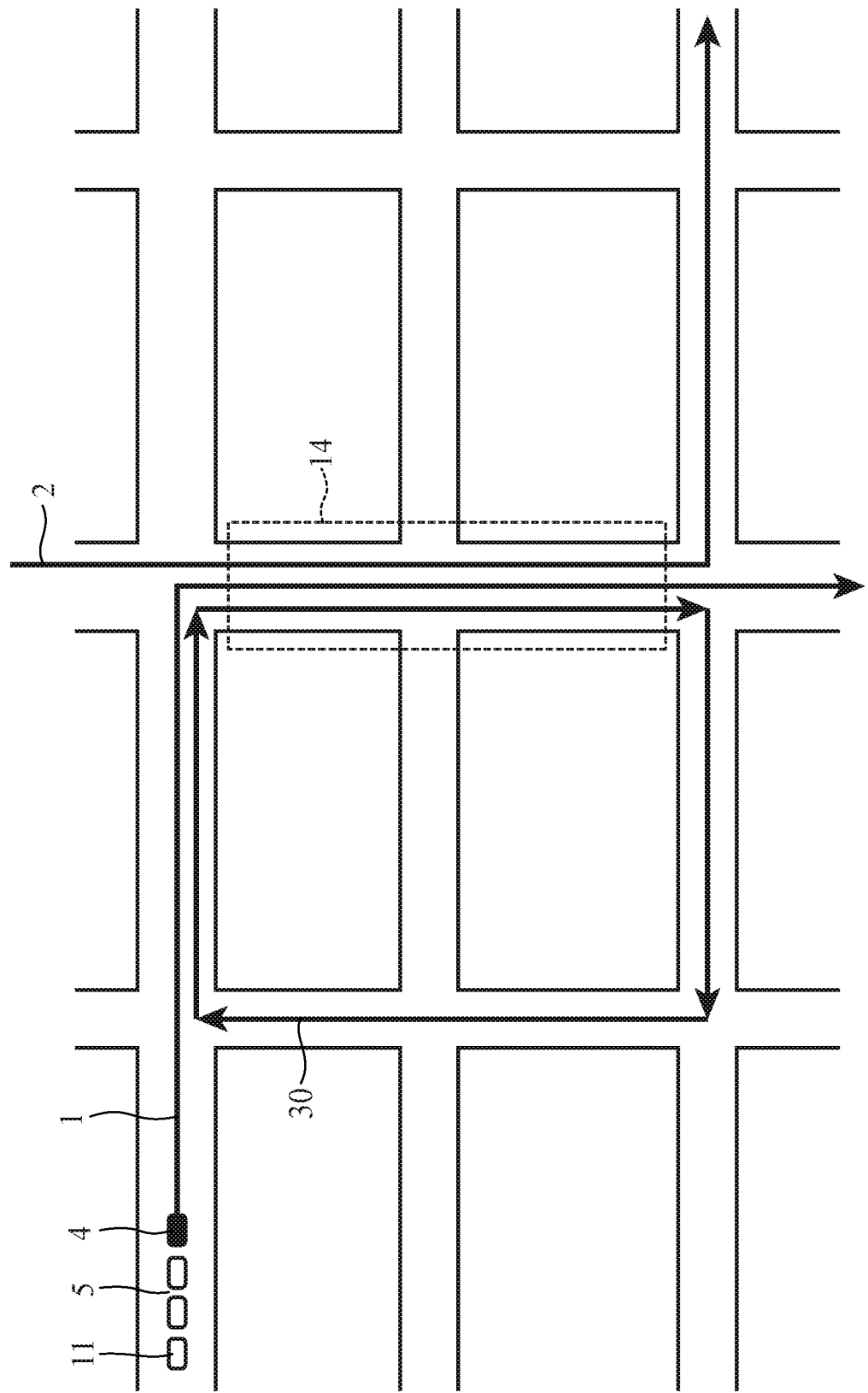
FIG. 23 is a diagram illustrating a routine-run-route change propriety determining process (step ST332 in FIG. 22) performed by the server for management.

FIG. 23 is a diagram illustrating a routine-run-route change propriety determining process (step ST332 in FIG. 22) performed by the server 300 for management. The delivery-side platoon including the routine-run vehicle 4 and the following vehicle group 5 including the user vehicle 11 is traveling on the routine-run route 1. The routine-run route 1 is a delivery-side routine-run route, and the routine-run route 2 is a takeover-side routine-run route. Since the routine-run vehicle 6 (not illustrated) that operates on the takeover-side routine-run route 2 is delayed due to traffic circumstances or the like, the delivery-side routine-run vehicle 4 gains time until the routine-run vehicle 6 arrives at the takeover position 14 in order to deliver the user vehicle 11 to the routine-run vehicle 6. Accordingly, the route determination unit 303 searches for a circle route 30 on which the routine-run vehicle 4 can circle around the takeover position 14, and if there is the circle route 30 on which the routine-run vehicle 4 can circle around the takeover position 14, the route determination unit 303 determines that the routine-run route can be changed. The route determination unit 303 sets a route obtained by adding the circle route 30 to the routine-run route 1 as a changed routine-run route. Note that, in this example, the routine-run route 1 can be changed without changing the takeover position 14, but in a case where there is no circle route 30 passing through the takeover position 14, the route determination unit 303 can change the takeover position 14 to a position where the circle route can be set.

Figure 24:
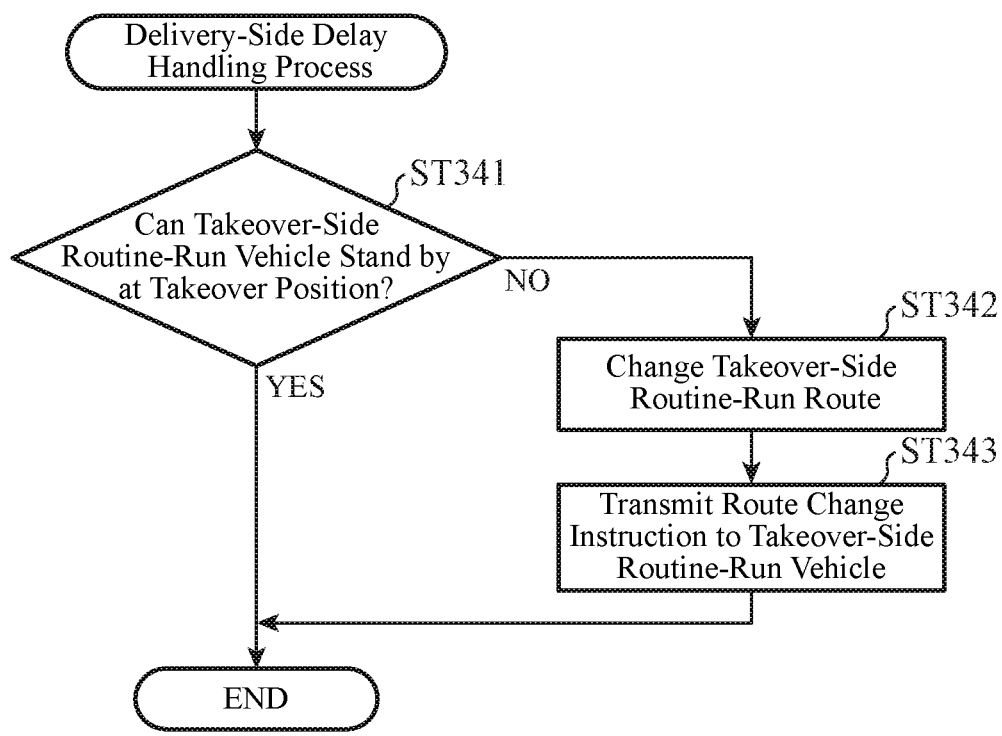
FIG. 24 is a flowchart of a delivery-side delay-handling process (step ST324 in FIG. 21) performed by the server for management.

FIG. 24 is a flowchart of the delivery-side delay-handling process (step ST324 in FIG. 21) performed by the server 300 for management.

In step ST341, the route determination unit 303 transmits "standby instruction" to the routine-run-vehicle control device 100 mounted on the takeover-side routine-run vehicle via the communication unit 301 in order to check whether or not the takeover-side routine-run vehicle and the following vehicle group thereof can stand by around the takeover position, and waits for a response. If the communication unit 301 receives a response of "standby is possible" from the routine-run-vehicle control device 100 (step ST341 "YES"), the process of the route determination unit 303 ends. On the other hand, if the communication unit 301 receives a response of "standby is impossible" from the routine-run-vehicle control device 100 (step ST341 "NO"), the process of the route determination unit 303 transitions to step ST342.

In step ST342, the route determination unit 303 searches for a circle route for causing the takeover-side routine-run vehicle that has already arrived at the takeover position to circle around the takeover position, and changes the routine-run route of the takeover-side routine-run vehicle based on the searched circle route. In step ST343, the route determination unit 303 transmits, via the communication unit 301, a route change instruction including the changed routine-run route to the routine-run-vehicle control device 100 mounted on the takeover-side routine-run vehicle.

Note that, although the route determination unit 303 of the server 300 for management determines the routine-run routes 1, 2, and 3 of the routine-run vehicles 4, 6, and 8, it is conceivable that the routine-run vehicles 4, 6, and 8 cannot approach the user vehicle 11 in a follow standby state for some reason. For example, there are factors that the road is too narrow or too complicated for the routine-run vehicle 4 and the following vehicle group 5 to travel in line. In this case, the server 300 for management moves the drone 400 mounted on each of the routine-run vehicles 4, 6, and 8 to the user vehicle 11 in the follow standby state, and causes the user vehicle 11 to follow the drone 400 functioning as a routine-run vehicle. Specifically, the drone 400 mounted on the routine-run vehicle 4 guides the user vehicle 11 from the home 10 to the routine-run vehicle 4. In addition, for example, the drone 400 mounted on the routine-run vehicle 6 guides the user vehicle 11 on standby at the takeover position 14 to the routine-run vehicle 6. Furthermore, for example, the drone 400 mounted on the routine-run vehicle 6 guides the user vehicle 11 on standby at the takeover position 15 to the routine-run vehicle 6. Further, for example, the drone 400 mounted on the routine-run vehicle 6 guides the user vehicle 11 from the routine-run vehicle 6 to the destination 12. The following-vehicle control device 200 mounted on the user vehicle 11 follows the drone 400 instead of the routine-run vehicle.

Figure 25:
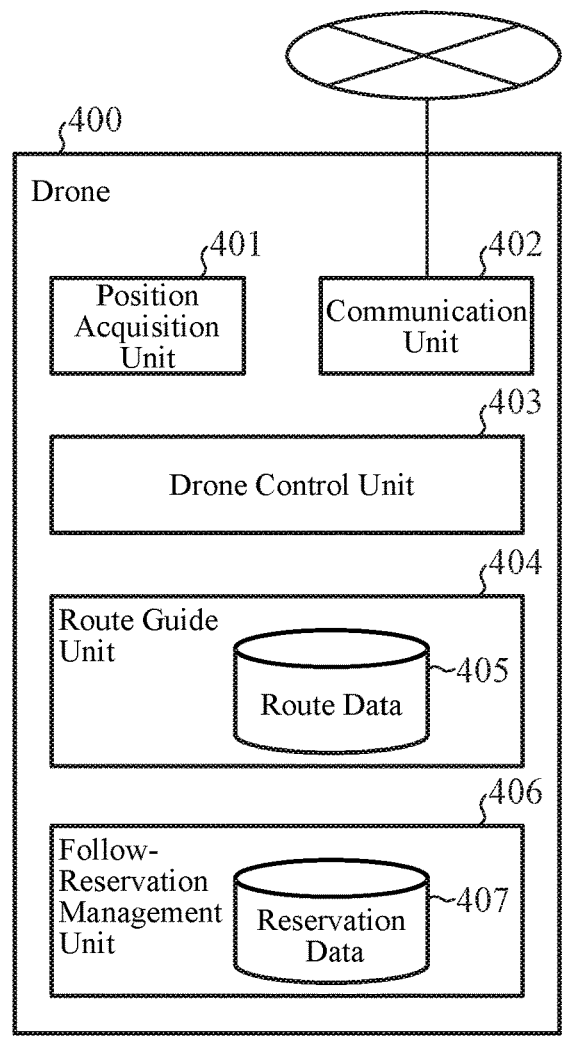
FIG. 25 is a block diagram illustrating a configuration example of a drone according to the first embodiment.

FIG. 25 is a block diagram illustrating a configuration example of the drone 400 according to the first embodiment. The drone 400 includes a position acquisition unit 401, a communication unit 402, a drone control unit 403, a route guide unit 404, and a follow-reservation management unit 406.

The route determination unit 303 of the server 300 for management determines a guide route of the drone 400 on the basis of position information of a following vehicle, position information of a routine-run vehicle, a takeover position, and the like. The guide route is, for example, a route that connects a departure place or a takeover position where the following vehicle is on standby to a routine-run route of the routine-run vehicle to be followed by the following vehicle. The communication unit 301 transmits drone reservation data including the guide route determined by the route determination unit 303 and identification information of the following vehicle to the routine-run-vehicle control device 100 mounted on the routine-run vehicle. The vehicle-outside communication unit 101 of the routine-run-vehicle control device 100 transmits the drone reservation data received by the server 300 for management to the drone 400. The communication unit 402 of the drone 400 receives the drone reservation data transmitted by the routine-run-vehicle control device 100. The route guide unit 404 stores the guide route included in the drone reservation data received by the communication unit 402 as route data 405. The follow-reservation management unit 406 stores the identification information of the following vehicle included in the drone reservation data as reservation data 407.

The position acquisition unit 401 acquires position information of the drone 400. The communication unit 402 communicates with the routine-run-vehicle control device 100 mounted on the routine-run vehicle and the following-vehicle control device 200 mounted on the following vehicle. The drone control unit 403 causes the drone 400 to fly along the guide route an instruction about which is given by the route guide unit 404. The route guide unit 404 instructs the drone control unit 403 that the drone 400 flies along the guide route indicated by the route data 405. The follow-reservation management unit 406 communicates with the following-vehicle control device 200 mounted on the following vehicle via communication unit 402 to determine whether or not the following vehicle matches the following vehicle included in the reservation data 407.

Next, the operation of the drone 400 will be described.

Figure 26:
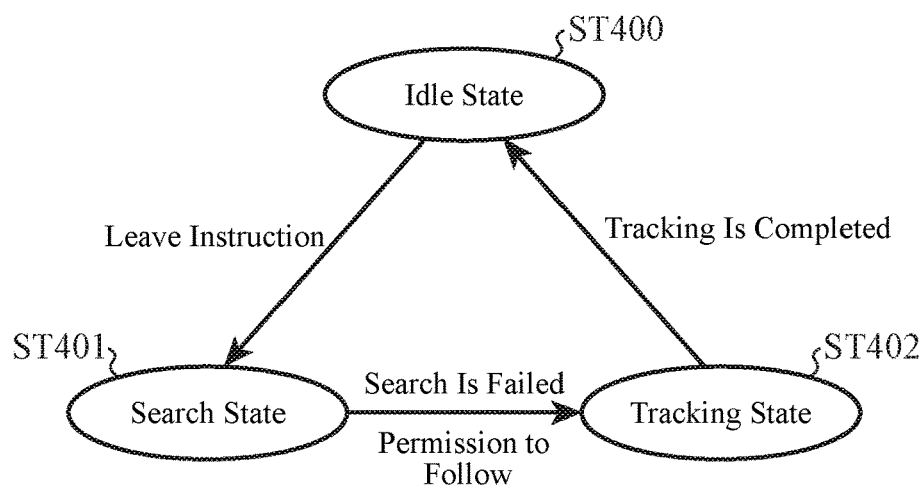
FIG. 26 is a state transition diagram of the drone in the first embodiment.

FIG. 26 is a state transition diagram of the drone 400 in the first embodiment.

The idle state in step ST400 is a state where the drone 400 is mounted on a routine-run vehicle. In the idle state, the drone 400 performs an idle process of FIG. 27.

Figure 27:
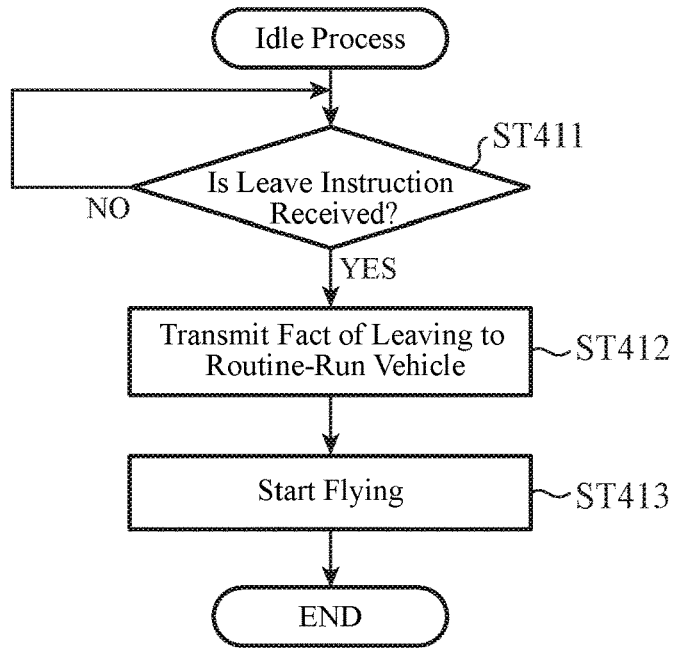
FIG. 27 is a flowchart of an idle process (step ST400 in FIG. 26) performed by the drone.

FIG. 27 is a flowchart of the idle process (step ST400 in FIG. 26) performed by the drone 400.

The following-vehicle management unit 110 of the routine-run-vehicle control device 100 refers to the reservation data 106, and transmits "leave instruction" to the drone 400 via the vehicle-outside communication unit 101 when the host routine-run vehicle approaches a standby position (for example, a takeover position) of a following vehicle that is going to follow the host routine-run vehicle. Note that the routine-run-vehicle control device 100 can transmit "leave instruction" including the drone reservation data.

In step ST411, if the communication unit 402 receives "leave instruction" from the routine-run-vehicle control device 100 (step ST411 "YES"), the process of the drone 400 transitions to step ST412, and if "leave instruction" is not received (step ST411 "NO"), the communication unit 402 repeats the process in step ST411.

In step ST412, the route guide unit 404 transmits the fact of leaving the routine-run vehicle to the routine-run-vehicle control device 100 via the communication unit 402. In step ST413, the route guide unit 404 gives the drone control unit 403 an instruction to start the flight of the drone 400 along the guide route indicated by the route data 405. Here, the state of the drone 400 transitions from the idle state in step ST400 to a search state in step ST401.

Figure 28:
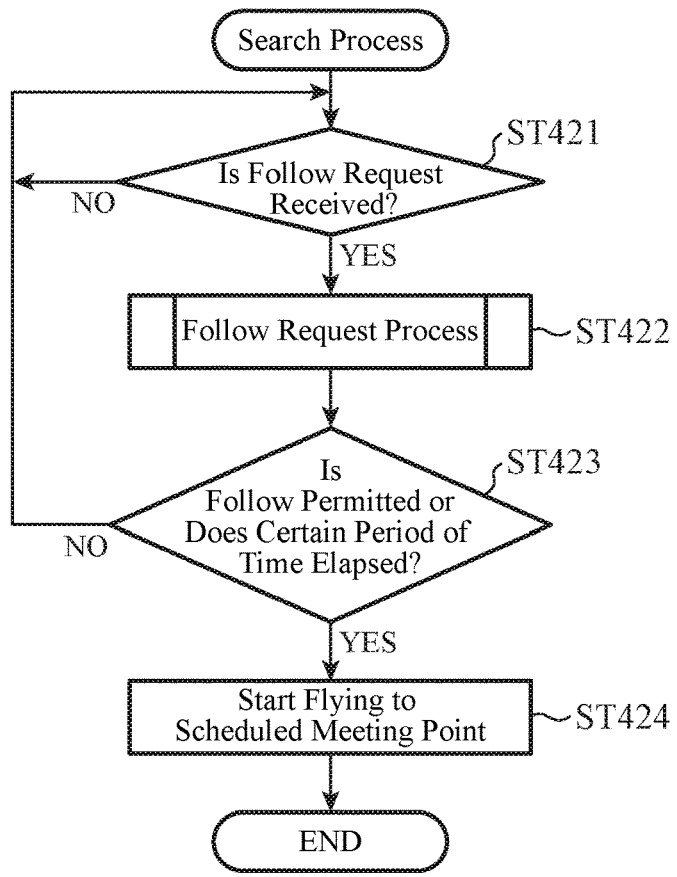
FIG. 28 is a flowchart of a search process (step ST401 in FIG. 26) performed by the drone.

FIG. 28 is a flowchart of a search process (step ST401 in FIG. 26) performed by the drone 400. This search process is performed while the drone 400 is flying along the guide route.

In step ST421, if the communication unit 402 receives "follow request" from the following-vehicle control device 200 mounted on the following vehicle (step ST421 "YES"), the process of the drone 400 transitions to step ST422, and if "follow request" is not received (step ST421 "NO"), the communication unit 402 repeats the process in step ST421.

Figure 29:
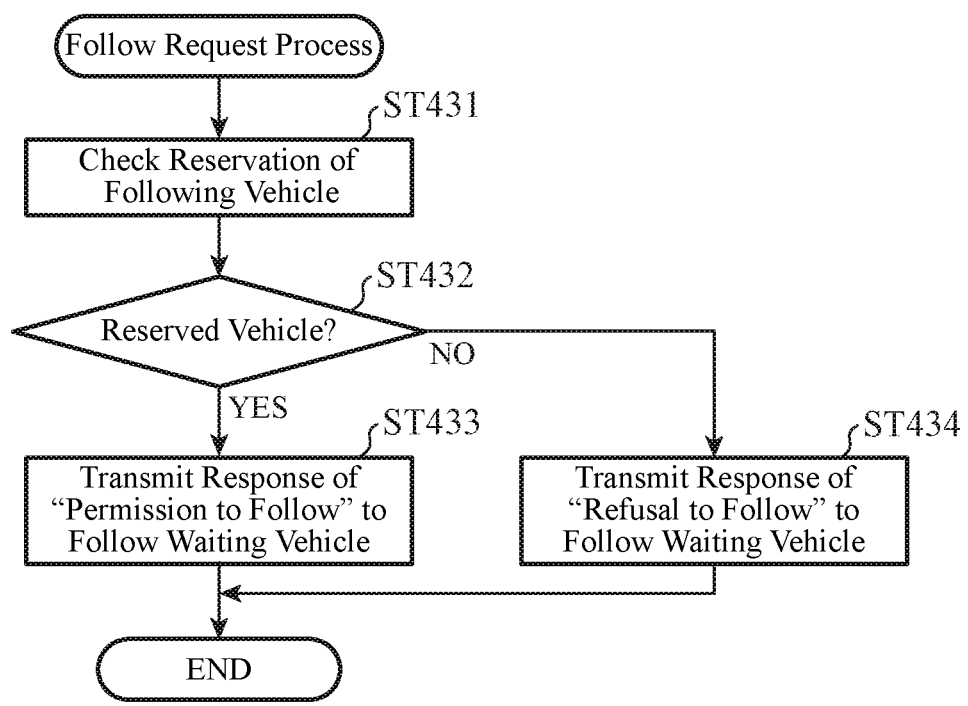
FIG. 29 is a flowchart of a follow request process (step ST422 in FIG. 28) performed by the drone.

FIG. 29 is a flowchart of a follow request process (step ST422 in FIG. 28) performed by the drone 400.

In step ST431, the follow-reservation management unit 406 determines whether or not the surrounding vehicle that has transmitted a follow request is a following vehicle included in the reservation data 407. If the identification information of the surrounding vehicle that has transmitted the follow request matches the identification information of the following vehicle included in the reservation data 407 (step ST432 "YES"), the follow-reservation management unit 406 determines that the surrounding vehicle is a following vehicle that is going to follow a routine-run vehicle, and transmits "permission to follow" to the following vehicle via the communication unit 402 (step ST433). On the other hand, if the identification information of the surrounding vehicle that has transmitted the follow request does not match the identification information of the following vehicle included in the reservation data 407 (step ST432 "NO"), the follow-reservation management unit 406 determines that the surrounding vehicle is not a reserved vehicle, and transmits "refusal to follow" to the surrounding vehicle via the communication unit 402. Since the follow request process is completed, the process of the drone 400 transitions to step ST423.

If "permission to follow" has been transmitted (step ST423 "YES"), the process of the drone 400 transitions to step ST424. Here, the state of the drone 400 transitions from the search state in step ST401 to a tracking state in step ST402.

In addition, if "refusal to follow" is transmitted, but a certain period of time (for example, five minutes) elapses since the arrival of the drone 400 at the takeover position (step ST423 "YES"), it is determined that the search for the following vehicle has failed, and the process of the drone 400 transitions to step ST423. Also in this case, the state of the drone 400 transitions from the search state in step ST401 to the tracking state in step ST402.

On the other hand, if "permission to follow" is not transmitted and the certain period of time does not elapse since the arrival of the drone 400 at the takeover position (step ST423 "NO"), the process of the drone 400 transitions to step ST421, and the drone 400 waits for "follow request" from another following vehicle.

In step ST424, the route guide unit 404 gives the drone control unit 403 an instruction to fly the drone 400 to a scheduled meeting point with the routine-run vehicle along the guide route indicated by the route data 405. The following vehicle follows the drone 400 and moves to the scheduled meeting point. The state of the drone 400 transitions from the search state in step ST401 to the tracking state in step ST402.

Figure 30:
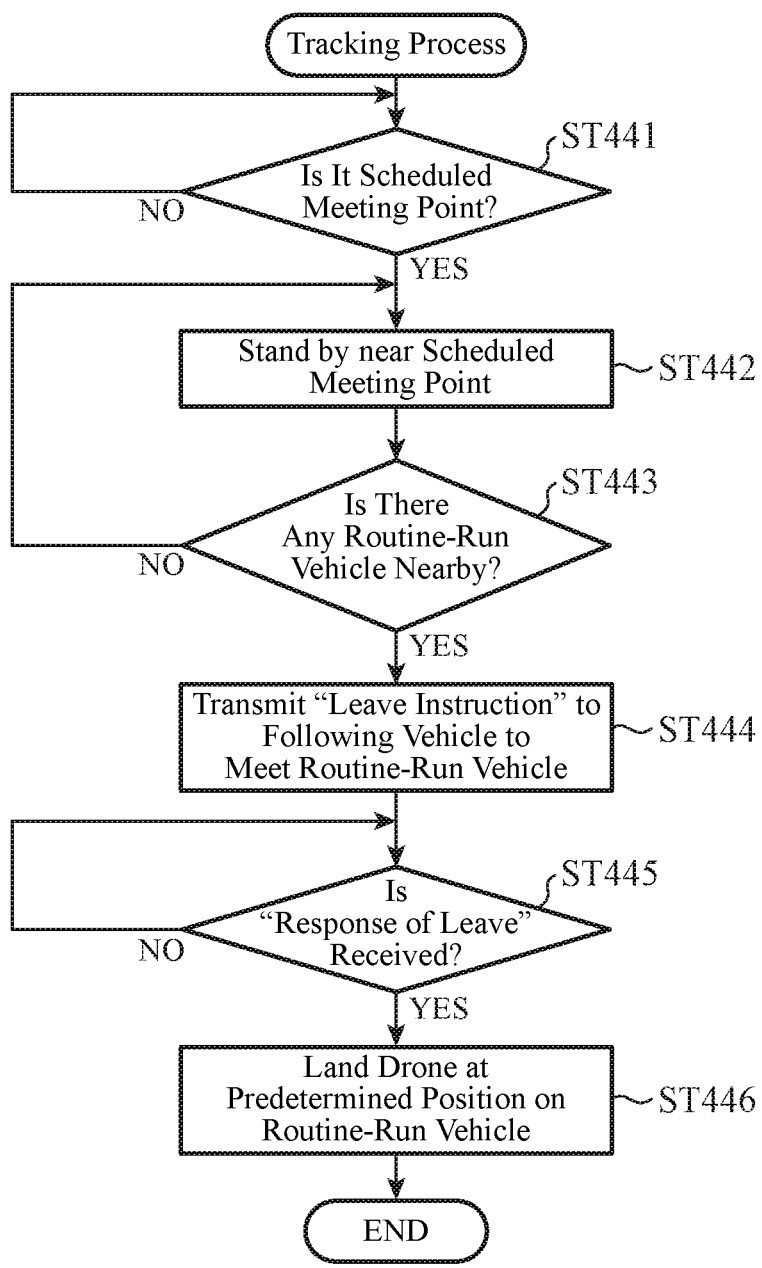
FIG. 30 is a flowchart of a tracking process (step ST402 in FIG. 26) performed by the drone.

FIG. 30 is a flowchart of a tracking process (step ST402 in FIG. 26) performed by the drone 400.

In step ST441, the route guide unit 404 compares position information acquired by the position acquisition unit 401 with the scheduled meeting point until the drone 400 arrives at the scheduled meeting point (step ST441 "NO").

If the drone 400 arrives at the scheduled meeting point (step ST441 "YES"), the route guide unit 404 instructs the drone control unit 403 to stand by near the scheduled meeting point. In step ST443, the route guide unit 404 determines whether or not there is a routine-run vehicle to be followed near the drone 400 by, for example, communicating with the routine-run-vehicle control device 100 via the communication unit 402 (step ST443). If there is a routine-run vehicle near the drone 400 (step ST443 "YES"), the process of the drone 400 transitions to step ST444, and if there is no routine-run vehicle (step ST443 "NO"), the process of the drone 400 returns to step ST442.

In step ST444, the route guide unit 404 transmits "leave instruction" to the following vehicle that is going to follow the routine-run vehicle via the communication unit 402. In step ST445, if the route guide unit 404 receives "response of leave" from the following vehicle via the communication unit 402 (step ST445 "YES"), the process of the drone 400 transitions to step ST446 and if "response of leave" is not received (step ST445 "NO"), the process of the drone 400 returns to step ST445.

In step ST446, the route guide unit 404 instructs the drone control unit 403 to land the drone 400 at a predetermined position on the routine-run vehicle. When the drone 400 lands, the state of the drone 400 transitions from the tracking state in step ST402 to the idle state in step ST400.

Note that, in the above example, the drone 400 guides the following vehicle to the scheduled meeting point with the routine-run vehicle to be followed, but the embodiment is not limited thereto, and for example, an operator at a remote location can move the following vehicle to the scheduled meeting point by remote driving.

Finally, hardware configurations of the routine-run-vehicle control device 100, the following-vehicle control device 200, the server 300 for management, and the drone 400 will be described.

Figure 31:
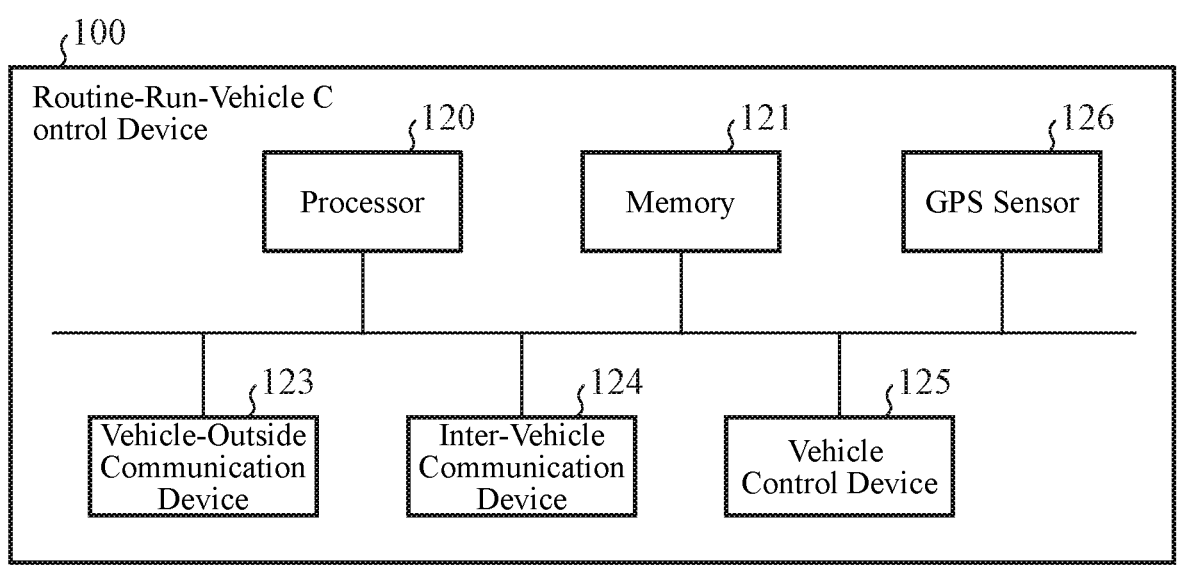
FIG. 31 is a diagram illustrating a hardware configuration example of the routine-run-vehicle control device according to the first embodiment.

FIG. 31 is a diagram illustrating a hardware configuration example of the routine-run-vehicle control device 100 according to the first embodiment. In the routine-run-vehicle control device 100, the vehicle-outside communication unit 101 is a vehicle-outside communication device 123, the inter-vehicle communication unit 102 is an inter-vehicle communication device 124, the vehicle control unit 103 is a vehicle control device 125, and the position acquisition unit 104 is a global positioning system (GPS) sensor 126. In addition, the functions of the route guide unit 108, the follow-reservation management unit 109, and the following-vehicle management unit 110 in the routine-run-vehicle control device 100 are implemented by a processor 120 that executes a program stored in a memory 121. The route data 105, the reservation data 106, and the following vehicle data 107 in the routine-run-vehicle control device 100 are stored in the memory 121.

The functions of the route guide unit 108, the follow-reservation management unit 109, and the following-vehicle management unit 110 are implemented by software, firmware, or a combination of software and firmware. The software or firmware is described as a program and stored in the memory 121. The processor 120 reads and executes the program stored in the memory 121 to implement the functions of each of the units. That is, the routine-run-vehicle control device 100 includes the memory 121 for storing a program that is executed by the processor 120 to perform steps illustrated in the flowcharts of FIGS. 12 to 16. It can also be said that this program causes a computer to perform procedures or methods performed by the route guide unit 108, the follow-reservation management unit 109, and the following-vehicle management unit 110.

Figure 32:
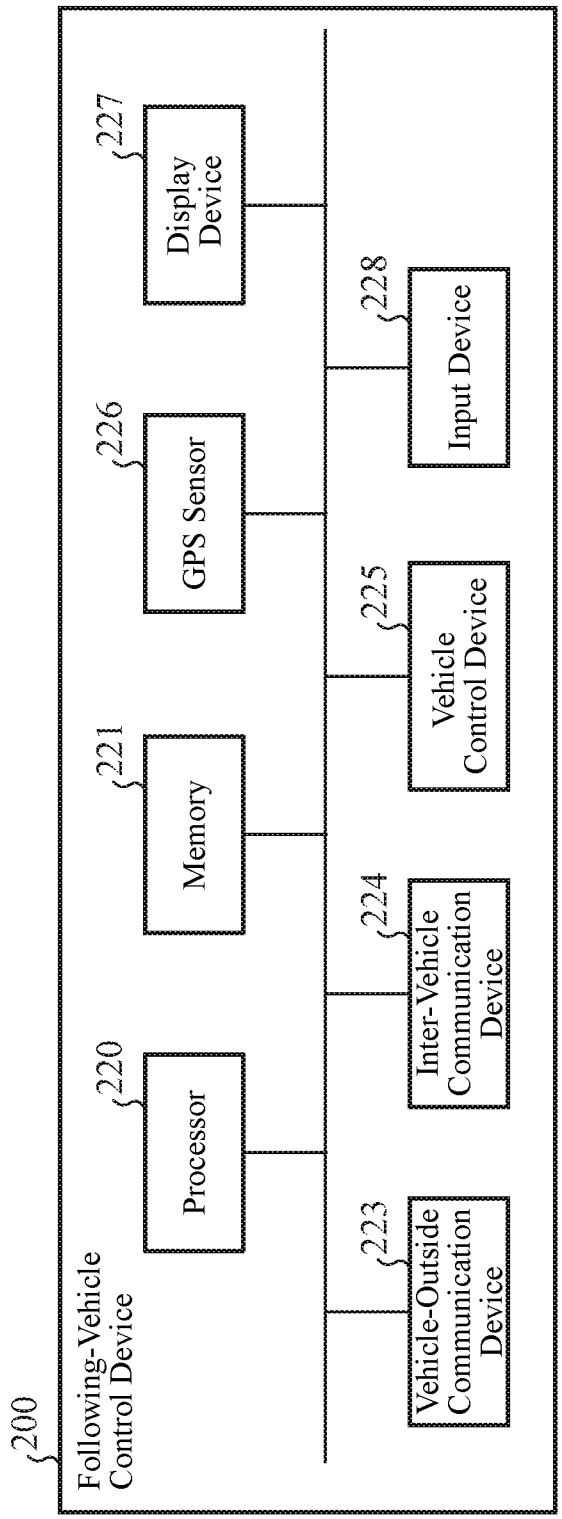
FIG. 32 is a diagram illustrating a hardware configuration example of the following-vehicle control device according to the first embodiment.

FIG. 32 is a diagram illustrating a hardware configuration example of the following-vehicle control device 200 according to the first embodiment. In the following-vehicle control device 200, the vehicle-outside communication unit 201 is a vehicle-outside communication device 223, the inter-vehicle communication unit 202 is an inter-vehicle communication device 224, the vehicle control unit 203 is a vehicle control device 225, the position acquisition unit 210 is a GPS sensor 226, the display unit 208 is a display device 227, and the operation unit 209 is an input device 228. In addition, the functions of the follow processing unit 204, the reservation processing unit 205, and the routine-run-vehicle management unit 207 in the following-vehicle control device 200 are implemented by a processor 220 that executes a program stored in a memory 221. The routine-run vehicle data 206 in the following-vehicle control device 200 is stored in the memory 221.

The functions of the follow processing unit 204, the reservation processing unit 205, and the routine-run-vehicle management unit 207 are implemented by software, firmware, or a combination of software and firmware. The software or firmware is described as a program and stored in the memory 221. The processor 220 reads and executes the program stored in the memory 221 to implement the functions of each of the units. That is, the following-vehicle control device 200 includes the memory 221 for storing a program that is executed by the processor 220 to perform steps illustrated in the flowcharts of FIGS. 6 to 10. It can also be said that this program causes a computer to perform procedures or methods performed by the follow processing unit 204, the reservation processing unit 205, and the routine-run-vehicle management unit 207.

Figure 33:
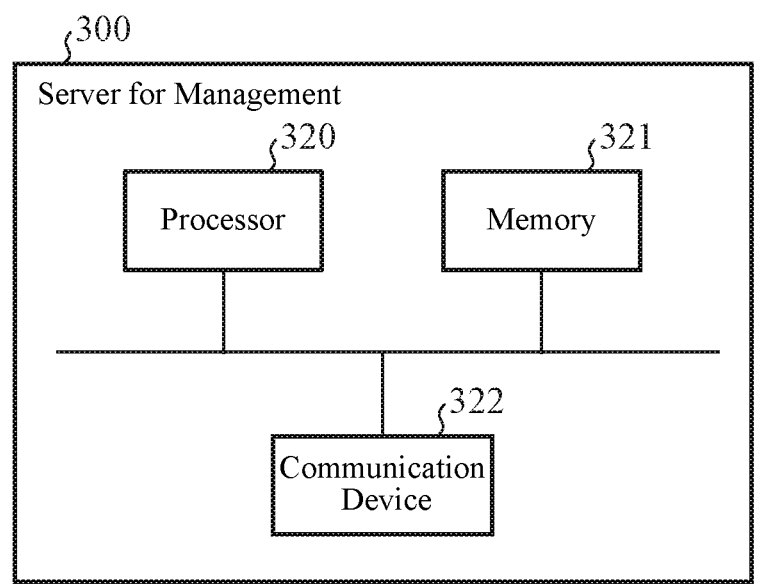
FIG. 33 is a diagram illustrating a hardware configuration example of the server for management according to the first embodiment.

FIG. 33 is a diagram illustrating a hardware configuration example of the server 300 for management according to the first embodiment. In the server 300 for management, the communication unit 301 is a communication device 322. In addition, the functions of the routine-run-vehicle determination unit 302, the route determination unit 303, the reservation management unit 304, the routine-run-vehicle management unit 306, and the following-vehicle management unit 308 in the server 300 for management are implemented by a processor 320 that executes a program stored in a memory 321. Furthermore, the reservation data 305, the routine-run vehicle data 307, and the following vehicle data 309 in the server 300 for management are stored in the memory 321.

The functions of the routine-run-vehicle determination unit 302, the route determination unit 303, the reservation management unit 304, the routine-run-vehicle management unit 306, and the following-vehicle management unit 308 are implemented by software, firmware, or a combination of software and firmware. The software or firmware is described as a program and stored in the memory 321. The processor 320 reads and executes the program stored in the memory 321 to implement the functions of each of the units. That is, the server 300 for management includes the memory 321 for storing a program that is executed by the processor 320 to perform steps illustrated in the flowcharts of FIGS. 17 to 24. It can also be said that this program causes a computer to perform procedures or methods performed by the routine-run-vehicle determination unit 302, the route determination unit 303, the reservation management unit 304, the routine-run-vehicle management unit 306, and the following-vehicle management unit 308.

Figure 34:
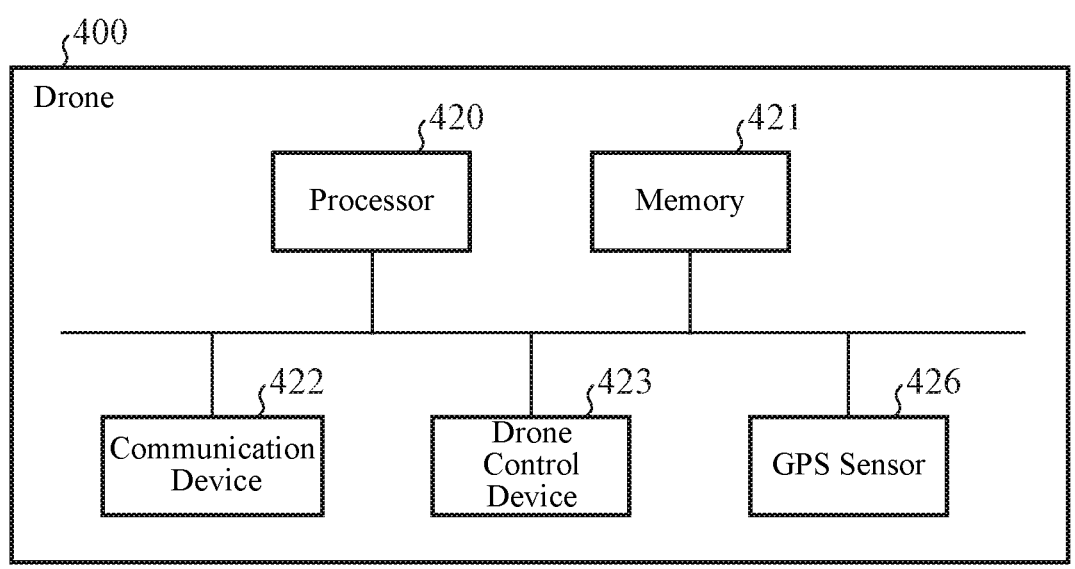
FIG. 34 is a diagram illustrating a hardware configuration example of the drone according to the first embodiment.

FIG. 34 is a diagram illustrating a hardware configuration example of the drone 400 according to the first embodiment. In the drone 400, the position acquisition unit 401 is a GPS sensor 426, the communication unit 402 is a communication device 422, and the drone control unit 403 is a drone control device 423. In addition, the functions of the route guide unit 404 and the follow-reservation management unit 406 in the drone 400 are implemented by a processor 420 that executes a program stored in a memory 421. The route data 405 and the reservation data 407 in the drone 400 are stored in the memory 421.

The functions of the route guide unit 404 and the follow-reservation management unit 406 are implemented by software, firmware, or a combination of software and firmware. The software or firmware is described as a program and stored in the memory 421. The processor 420 reads and executes the program stored in the memory 421 to implement the functions of each of the units. That is, the drone 400 includes the memory 421 for storing a program that is executed by the processor 420 to perform steps illustrated in the flowcharts of FIGS. 27 to 30. It can also be said that this program causes a computer to perform procedures or methods performed by the route guide unit 404 and the follow-reservation management unit 406.

Here, the processors 120, 220, 320, and 420 are a central processing unit (CPU), a processing device, an arithmetic device, or a microprocessor.

Examples of the memories 121, 221, 321, and 421 can include a nonvolatile or volatile semiconductor memory such as a random access memory (RAM), a read only memory (ROM), an erasable programmable ROM (EPROM), or a flash memory, or may include a magnetic disk such as a hard disk or a flexible disk, or may include an optical disk such as a compact disc (CD) or a digital versatile disc (DVD).

As described above, the server 300 for management according to the first embodiment includes the communication unit 301, the routine-run-vehicle determination unit 302, the route determination unit 303, and the reservation management unit 304. The communication unit 301 communicates with a plurality of routine-run vehicles and one or more following vehicles that are going to follow each of the routine-run vehicles. When the communication unit 301 receives a departure place and a destination of a certain following vehicle, the routine-run-vehicle determination unit 302 determines a route from the departure place to the destination, and a plurality of routine-run vehicles in charge of a plurality of routine-run areas overlapping the route. For each of the routine-run vehicles determined by the routine-run-vehicle determination unit 302, the route determination unit 303 determines a routine-run route on which the certain following vehicle and another following vehicle that are going to travel in the routine-run area in charge can follow, and determines a portion of the routine-run route overlapping the adjacent routine-run area as a takeover position at which the certain following vehicle is taken over to the next routine-run vehicle. The reservation management unit 304 transmits, via the communication unit 301, routine-run-vehicle reservation data including identification information of the certain following vehicle, the routine-run route and the takeover position determined by the route determination unit 303 to each of the routine-run vehicles that are determined by the routine-run-vehicle determination unit 302 and that the certain following vehicle is going to follow from the departure place to the destination. The reservation management unit 304 also transmits, via the communication unit 301, following-vehicle reservation data including identification information of the routine-run vehicles that the certain following vehicle is going to follow from the departure place to the destination and the takeover position to the certain following vehicle. In this manner, as the server 300 for management transmits the reservation data to the routine-run vehicle and the following vehicle, the server 300 for management integrally manages the routine-run vehicle and the following vehicle. As a result, excess and deficiency in the number of routine-run vehicles at the head of platoon travel can be prevented. In addition, since the server 300 for management can replace the routine-run vehicle followed by the following vehicle with another routine-run vehicle at a place where the routine-run routes intersect with each other, it is possible to continuously replace the routine-run vehicles from the departure place to the destination of the following vehicle. Therefore, the occupant of the following vehicle can move to a distant destination without manual driving.

Furthermore, according to the first embodiment, in a case where the delivery-side routine-run vehicle that a certain following vehicle is following arrives at the takeover position earlier than a takeover-side routine-run vehicle that the certain following vehicle is going to follow next, the route determination unit 303 transmits, to the takeover-side routine-run vehicle via the communication unit 301, a standby instruction to cause the delivery-side routine-run vehicle to stand by at the takeover position until the takeover-side routine-run vehicle arrives at the takeover position. In a case where the routine-run vehicle cannot reach the takeover position on time due to traffic circumstances or the like, the server 300 for management can dynamically change the routine-run route of the routine-run vehicle. Therefore, the following vehicle can start following the next routine-run vehicle without the occupant performing manual driving.

Furthermore, according to the first embodiment, in a case where the delivery-side routine-run vehicle that a certain following vehicle is following arrives at the takeover position after a takeover-side routine-run vehicle that the certain following vehicle is going to follow next, the route determination unit 303 transmits, to the takeover-side routine-run vehicle via the communication unit 301, a standby instruction to cause the takeover-side routine-run vehicle to stand by at the takeover position until the delivery-side routine-run vehicle arrives at the takeover position. In a case where the routine-run vehicle cannot reach the takeover position on time due to traffic circumstances or the like, the server 300 for management can cause the takeover-side routine-run vehicle to stand by at the takeover position. Therefore, the following vehicle can start following the next routine-run vehicle without the occupant performing manual driving.

Furthermore, according to the first embodiment, in a case where the delivery-side routine-run vehicle that a certain following vehicle is following arrives at the takeover position after the takeover-side routine-run vehicle that the certain following vehicle is going to follow next, and the takeover-side routine-run vehicle cannot stand by at the takeover position, the route determination unit 303 changes the routine-run route of the takeover-side routine-run vehicle so as to allow the takeover-side routine-run vehicle to circle around the takeover position until the delivery-side routine-run vehicle arrives at the takeover position, and transmits the changed routine-run route to the takeover-side routine-run vehicle via the communication unit. In a case where the routine-run vehicle cannot reach the takeover position on time due to traffic circumstances or the like, the server 300 for management can dynamically change the routine-run route of the routine-run vehicle. Therefore, the following vehicle can start following the next routine-run vehicle without the occupant performing manual driving.

Moreover, according to the first embodiment, in a case where a certain following vehicle cannot approach a routine-run vehicle to be followed, the route determination unit 303 determines a guide route for guiding the certain following vehicle to the routine-run vehicle by the drone 400 mounted on the routine-run vehicle, and the reservation management unit 304 transmits drone reservation data including the guide route determined by the route determination unit 303 to the drone 400 via the communication unit 301. In a case where the following vehicle cannot approach the routine-run vehicle due to traffic circumstances such as a narrow road or the like, or due to a departure place or a destination being away from the routine-run route, the drone 400 guides the following vehicle to the routine-run vehicle, so that it is not necessary to wastefully increase the number of routine-run vehicles.

In addition, the routine-run-vehicle control device 100 according to the first embodiment includes the vehicle-outside communication unit 101, the route guide unit 108, the inter-vehicle communication unit 102, and the following-vehicle management unit 110. The vehicle-outside communication unit 101 receives the routine-run-vehicle reservation data transmitted by the server 300 for management. The route guide unit 108 operates the routine-run vehicle along the routine-run route included in the routine-run-vehicle reservation data received by the vehicle-outside communication unit 101. The inter-vehicle communication unit 102 communicates with vehicles around the routine-run vehicle. In a case where the inter-vehicle communication unit 102 receives a follow request from a vehicle, the following-vehicle management unit 110 gives the vehicle vehicle-following permission via the inter-vehicle communication unit 102 if the identification information of the vehicle matches the identification information of the following vehicle included in the routine-run-vehicle reservation data, and gives the vehicle a leave instruction via the inter-vehicle communication unit 102 in a case where the routine-run vehicle comes to the takeover position included in the routine-run-vehicle reservation data. In this manner, as the server 300 for management transmits the reservation data to the routine-run vehicle and the following vehicle, the server 300 for management integrally manages the routine-run vehicle and the following vehicle. As a result, excess and deficiency in the number of routine-run vehicles at the head of platoon travel can be prevented. In addition, since the server 300 for management can replace the routine-run vehicle followed by the following vehicle with another routine-run vehicle at a place where the routine-run routes intersect with each other, it is possible to continuously replace the routine-run vehicles from the departure place to the destination of the following vehicle. Therefore, the occupant of the following vehicle can move to a distant destination without manual driving.

In addition, the following-vehicle control device 200 according to the first embodiment includes the vehicle-outside communication unit 201, the inter-vehicle communication unit 202, and the follow processing unit 204. The vehicle-outside communication unit 201 transmits the departure place and the destination of the following vehicle to the server 300 for management, and receives the following-vehicle reservation data transmitted by the server 300 for management. The inter-vehicle communication unit 202 communicates with the routine-run vehicle. In a case where the following vehicle comes to each takeover position included in the following-vehicle reservation data, the follow processing unit 204 issues a follow request to a routine-run vehicle to be followed via the inter-vehicle communication unit 202, in a case where the inter-vehicle communication unit 202 receives permission to follow from the routine-run vehicle to be followed, the follow processing unit 204 starts following the routine-run vehicle to be followed, and in a case where the inter-vehicle communication unit 202 receives an instruction to leave the routine-run vehicle to be followed, the follow processing unit 204 ends following the routine-run vehicle to be followed. In this manner, as the server 300 for management transmits the reservation data to the routine-run vehicle and the following vehicle, the server 300 for management integrally manages the routine-run vehicle and the following vehicle. As a result, excess and deficiency in the number of routine-run vehicles at the head of platoon travel can be prevented. In addition, since the server 300 for management can replace the routine-run vehicle followed by the following vehicle with another routine-run vehicle at a place where the routine-run routes intersect with each other, it is possible to continuously replace the routine-run vehicles from the departure place to the destination of the following vehicle. Therefore, the occupant of the following vehicle can move to a distant destination without manual driving.

Further, according to the first embodiment, when finishing following the routine-run vehicle to be followed, the follow processing unit 204 leaves the routine-run vehicle to be followed and stands by at the takeover position, and issues a follow request to a new routine-run vehicle to be followed next included in the following-vehicle reservation data via the inter-vehicle communication unit 202. As a result, in a case where the routine-run vehicle that the following vehicle is going to follow next cannot reach the takeover position on time due to traffic circumstances or the like, the following vehicle can stand by until the routine-run vehicle comes. Therefore, the following vehicle can start following the next routine-run vehicle without the occupant performing manual driving.

Note that it is possible to modify or omit any component of the embodiment within the scope of the present disclosure.

INDUSTRIAL APPLICABILITY

Since the traffic system according to the present disclosure allows the occupant of the following vehicle to move to a distant destination without performing manual driving, the traffic system according to the present disclosure is suitable for use in a traffic system or the like that causes vehicles with self-driving level 2 or higher to perform platoon travel.

REFERENCE SIGNS LIST

1, 2, 3: routine-run route, 4, 6, 8: routine-run vehicle, 5, 7, 9: following vehicle group, 10: home, 10*a*, 10*b*, 10*c*, 10*d*: departure place, 11: user vehicle, 12: destination, 14, 15: takeover position, 20: route, 21, 22, 23: routine-run area, 24, 25: candidate for a takeover position, 30: circle route, 100: routine-run-vehicle control device, 101: vehicle-outside communication unit, 102: inter-vehicle communication unit, 103: vehicle control unit, 104: position acquisition unit, 105: route data, 106: reservation data, 107: following vehicle data, 108: route guide unit, 109: follow-reservation management unit, 110: following-vehicle management unit, 120: processor, 121: memory, 123: vehicle-outside communication device, 124: inter-vehicle communication device, 125: vehicle control device, 126: GPS sensor, 200: following-vehicle control device, 201: vehicle-outside communication unit, 202: inter-vehicle communication unit, 203: vehicle control unit, 204: follow processing unit, 205: reservation processing unit, 206: routine-run vehicle data, 207: routine-run-vehicle management unit, 208: display unit, 209: operation unit, 210: position acquisition unit, 220: processor, 221: memory, 223: vehicle-outside communication device, 224: inter-vehicle communication device, 225: vehicle control device, 226: GPS sensor, 227: display device, 228: input device, 300: server for management, 301: communication unit, 302: routine-run-vehicle determination unit, 303: route determination unit, 304: reservation management unit, 305: reservation data, 306: routine-run-vehicle management unit, 307: routine-run vehicle data, 308: following-vehicle management unit, 309: following vehicle data, 320: processor, 321: memory, 322: communication device, 400: drone, 401: position acquisition unit, 402: communication unit, 403: drone control unit, 404: route guide unit, 405: route data, 406: follow-reservation management unit, 407: reservation data, 420: processor, 421: memory, 422: communication device, 423: drone control device, 426: GPS sensor

The invention claimed is:

1. A server for management comprising:
processing circuitry configured to
communicate with a plurality of routine-run vehicles and one or more following vehicles that are going to follow each of the routine-run vehicles;
determine, when a departure place and a destination of a first following vehicle are received, a route from the departure place to the destination and first routine-run vehicles in charge of a plurality of routine-run areas overlapping the route, the first routine-run vehicles being determined as being scheduled to routinely run routes through ones of the routine-run areas;
determine, for each of the determined first routine-run vehicles, a routine-run route on which the first following vehicle and a second following vehicle, that are going to travel in a routine-run area, can follow, and determine a portion of the routine-run route overlapping an adjacent routine-run area as a takeover position at which the first following vehicle is taken over to a next second routine-run vehicle, the next second routine-run vehicle being determined as being scheduled to routinely run routes through ones of the routine-run areas, and the takeover position being determined as an overlap between the adjacent routine-run area and any of the routinely run routes through ones of the routine-run areas; and
transmit, via communication, routine-run-vehicle reservation data including identification information of the determined first following vehicle, the routine-run route and the takeover position to each of the determined first routine-run vehicles that the first following vehicle is going to follow from the departure place to the destination, and transmit, via communication, following-vehicle reservation data including identification information of the first routine-run vehicles that the first following vehicle is going to follow from the departure place to the destination and the takeover position to the first following vehicle.

2. The server for management according to claim 1, wherein in a case where a delivery-side routine-run vehicle that the first following vehicle is following arrives at a takeover position earlier than a takeover-side routine-run vehicle that the first following vehicle is going to follow next, the processing circuitry changes a routine-run route of the delivery-side routine-run vehicle so as to allow the delivery-side routine-run vehicle to circle around the takeover position until the takeover-side routine-run vehicle arrives at the takeover position, and transmits a changed routine-run route to the delivery-side routine-run vehicle via the communication.

3. The server for management according to claim 1, wherein in a case where a delivery-side routine-run vehicle that the first following vehicle is following arrives at a takeover position after a first takeover-side routine-run vehicle that the first following vehicle is going to follow next, the processing circuitry transmits, to the first takeover-side routine-run vehicle via the communication, a standby instruction to cause the first takeover-side routine-run vehicle to stand by at the takeover position until the delivery-side routine-run vehicle arrives at the takeover position.

4. The server for management according to claim 3, wherein in a case where the delivery-side routine-run vehicle that the first following vehicle is following arrives at a takeover position after the takeover-side routine-run vehicle that the first following vehicle is going to follow next, and the takeover-side routine-run vehicle cannot stand by at the takeover position, the processing circuitry changes a routine-run route of the takeover-side routine-run vehicle so as to allow the takeover-side routine-run vehicle to circle around the takeover position until the delivery-side routine-run vehicle arrives at the takeover position, and transmits a changed routine-run route to the takeover-side routine-run vehicle via the communication.

5. The server for management according to claim 1,
wherein in a case where the first following vehicle cannot approach a third routine-run vehicle to be followed, the processing circuitry determines a guide route for guiding the first following vehicle to the third routine-run vehicle by a drone mounted on the third routine-run vehicle, and
the processing circuitry transmits drone reservation data including the determined guide route to the drone via the communication.

6. A routine-run-vehicle control device mounted on a third routine-run vehicle, to communicate with the server for management according to claim 1, the routine-run-vehicle control device comprising:
processing circuitry configured to
receive routine-run-vehicle reservation data transmitted by the server for management;
operate the third routine-run vehicle along a routine-run route included in the received routine-run-vehicle reservation data;

communicate with a vehicle around the third routine-run vehicle; and
give, in a case where a follow request from the vehicle is received, vehicle-following permission to the vehicle when identification information of the vehicle matches identification information of a following vehicle included in the routine-run-vehicle reservation data, and to give the vehicle a leave instruction when the third routine-run vehicle comes to a takeover position included in the routine-run-vehicle reservation data.

7. A following-vehicle control device mounted on a third following vehicle, to communicate with the server for management according to claim 1, the following-vehicle control device comprising:
processing circuitry configured to
transmit a departure place and a destination of the third following vehicle to the server for management, and receive following-vehicle reservation data transmitted by the server for management;
communicate with a fourth routine-run vehicle; and
issue a follow request to the fourth routine-run vehicle to be followed in a case where the third following vehicle comes to an individual takeover position included in the following-vehicle reservation data;
start following the fourth routine-run vehicle to be followed, in a case where vehicle-following permission is received from the fourth routine-run vehicle to be followed; and
end following the fourth routine-run vehicle to be followed in a case where an instruction to leave the fourth routine-run vehicle to be followed is received.

8. The following-vehicle control device according to claim 7,
wherein when finishing following the fourth routine-run vehicle to be followed, the processing circuitry leaves the fourth routine-run vehicle to be followed and stands by at a takeover position, and
issues a follow request to a new fifth routine-run vehicle to be followed next included in the following-vehicle reservation data.

9. The server for management according to claim 1, wherein at least one of the first routine-run vehicles and the next second routine-run vehicle is any of a public bus, a round bus, a tourist bus, a semi-trailer truck, and a night bus.

10. The server for management according to claim 1, wherein when determining, for each of the determined first routine-run vehicles, the routine-run route on which the first following vehicle and the second following vehicle, that are going to travel in the routine-run area, can follow, and the portion of the routine-run route overlapping an adjacent routine-run area as the takeover position at which the first following vehicle is taken over to the next second routine-run vehicle, the next second routine-run vehicle, at least one of the first routine-run vehicles, and at least one of the first following vehicle and the second following vehicle are already travelling in one or more of the routine-run areas and the adjacent routine-run area.

* * * * *